(12) United States Patent
Shimada

(10) Patent No.: US 9,247,137 B2
(45) Date of Patent: Jan. 26, 2016

(54) IMAGE PICKUP APPARATUS AND IMAGE PICKUP METHOD WHICH ACQUIRES BRIGHT-TIME IMAGE DATA AND DARK-TIME IMAGE DATA TO CORRECT DARK CURRENT

(71) Applicant: OLYMPUS CORPORATION, Shibuya-ku, Tokyo (JP)

(72) Inventor: Yoshinao Shimada, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/270,102

(22) Filed: May 5, 2014

(65) Prior Publication Data

US 2014/0362241 A1 Dec. 11, 2014

(30) Foreign Application Priority Data

Jun. 6, 2013 (JP) ................................. 2013-120068

(51) Int. Cl.
| | |
|---|---|
| *H04N 5/228* | (2006.01) |
| *H04N 5/232* | (2006.01) |
| *H04N 5/238* | (2006.01) |
| *H04N 5/361* | (2011.01) |
| *H04N 9/64* | (2006.01) |

(52) U.S. Cl.
CPC ........... *H04N 5/23264* (2013.01); *H04N 5/238* (2013.01); *H04N 5/2328* (2013.01); *H04N 5/23245* (2013.01); *H04N 5/23258* (2013.01); *H04N 5/23274* (2013.01); *H04N 5/361* (2013.01)

(58) Field of Classification Search
USPC ............ 348/208.99, 208.5, 208.12, 241, 243, 348/208.1
See application file for complete search history.

(56) References Cited

U.S. PATENT DOCUMENTS

| | | | | | |
|---|---|---|---|---|---|
| 6,144,408 | A | * | 11/2000 | MacLean ............... | H04N 9/045 348/241 |
| 7,832,928 | B2 | * | 11/2010 | Topfer ..................... | G06T 5/50 250/370.09 |
| 7,856,174 | B2 | * | 12/2010 | Tanaka et al. ................... | 396/55 |
| 8,319,843 | B2 | * | 11/2012 | Tamura .................... | 348/208.99 |
| 8,564,696 | B2 | * | 10/2013 | Okamura ...................... | 348/241 |
| 8,810,667 | B2 | * | 8/2014 | Toyoda et al. ............ | 348/208.99 |
| 8,982,249 | B2 | * | 3/2015 | Uchida ......................... | 348/243 |
| 9,041,821 | B2 | * | 5/2015 | Kashiwagi et al. ........ | 348/218.1 |
| 2006/0132612 | A1 | * | 6/2006 | Kawahara ................. | 348/208.6 |

FOREIGN PATENT DOCUMENTS

| | | |
|---|---|---|
| JP | 2000-209506 A | 7/2000 |
| JP | 2004-229032 A | 8/2004 |

* cited by examiner

*Primary Examiner* — Ngoc-Yen Vu

(74) *Attorney, Agent, or Firm* — Holtz, Holtz, Goodman & Chick PC

(57) ABSTRACT

An image pickup apparatus including: an image pickup section acquiring a bright-time image and acquiring a dark-time image with a same exposure time period as the bright-time image; a shake detection section detecting a shake; an image cut-out section cutting out a cut-out bright-time image for which the shake is corrected, from the bright-time image, on the basis of the shake detected by the shake detection section and cutting out a cut-out dark-time image at a same cut-out position as the cut-out bright-time image, from the dark-time image; and an image processing section generating a corrected image for which dark current is corrected, by subtracting the cut-out dark-time image from the cut-out bright-time image.

7 Claims, 18 Drawing Sheets

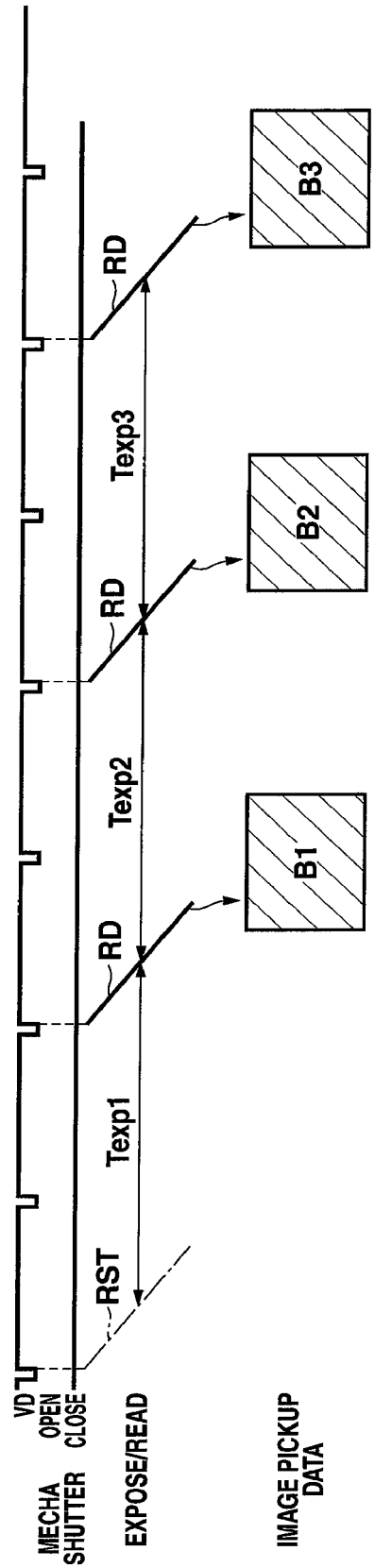

IMAGE PICKUP APPARATUS AND IMAGE PICKUP METHOD WHICH ACQUIRES BRIGHT-TIME IMAGE DATA AND DARK-TIME IMAGE DATA TO CORRECT DARK CURRENT

CROSS REFERENCE TO RELATED APPLICATION

This application claims benefit of Japanese Application No. 2013-120068 filed in Japan on Jun. 6, 2013, the entire contents of which are incorporated herein by this reference.

BACKGROUND OF THE INVENTION

1. Field of the Invention

The present invention relates to an image pickup apparatus and an image pickup method for acquiring bright-time image data and dark-time image data to correct dark current.

2. Description of the Related Art

When an S/N ratio decreases, image noise caused by dark current is conspicuous, for example, in the case of acquiring an image by performing long time period exposure of an object with a low luminance. For removal of such dark current noise, various proposals have been provided conventionally.

For example, in Japanese Patent Application Laid-Open Publication No. 2000-209506, a technique is described in which, in view of a fact that dark current increases or decreases according to a temperature of an image pickup device or an exposure time period, image quality deterioration caused by the dark current is reduced by performing a charge storage operation for a same exposure time period as a bright-time image to acquire a dark-time image due to a dark-current component in a state that the whole image pickup device is shielded from light, immediately after the bright-time image is picked up, and subtracting the dark-time image from the bright-time image.

In Japanese Patent Application Laid-Open Publication No. 2004-229032, a technique as shown below is described which is for reducing troublesomeness of performing photographing of a dark-time image accompanying photographing of a bright-time image. That is, dark-exposure photographing is performed multiple times with different combinations of a shutter speed and camera sensitivity, and obtained multiple pieces of dark image data are stored in a memory before shipment of a digital camera. Then, at the time of performing actual photographing, noise correction data corresponding to a shutter speed and camera sensitivity at the time of obtaining actually photographed image data is calculated on the basis of the dark image data read from the memory, and noise is removed by subtracting the calculated noise correction data from the actually photographed image data.

As a technique making it possible to confirm a state of an image being exposed, at the time of performing long-time-period exposure, a so-called live bulb photographing technique is proposed and productized. The live bulb photographing is a technique making it possible to observe a state of an image being exposed by time-dividing a long-time-period exposed image into multiple exposed images, and reading and displaying the exposed images.

A process for removing dark current noise in the live bulb photographing will be described with reference to FIGS. 24 and 25. FIG. 24 is a timing chart showing an operation at the time of performing live-bulb photographing of a bright-time image, and FIG. 25 is a timing chart showing an operation at the time of performing live-bulb photographing of a dark-time image. Note that FIGS. 24 and 25 illustrate a case of dividing a whole exposure time period Texp into three divided exposure time periods Texp1, Texp2 and Texp3.

As shown in FIG. 24, the live bulb photographing of a bright-time image is started by opening a mechanical shutter (hereinafter "mechanical" will be appropriately abbreviated as "mecha") and applying a reset pulse RST to pixels to perform reset.

Then, when the first divided exposure time period Texp1 has elapsed after start of exposure, first pixel reading is performed by starting application of a read pulse RD in synchronization with a vertical synchronizing signal VD, and a first piece of time-division bright-time image data A1 is acquired as image pickup data. The acquired piece of time-division bright-time image data A1 is displayed on a display section of an image pickup apparatus after necessary image processing is performed.

Next, when the second divided exposure time period Texp2 has elapsed after the first pixel reading, second pixel reading is performed by starting application of a read pulse RD in synchronization with a vertical synchronizing signal VD, and a second piece of time-division bright-time image data A2 is acquired as image pickup data. The acquired piece of time-division bright-time image data A2 is added to the first piece of time-division bright-time image data A1 and displayed on the display section of the image pickup apparatus after necessary image processing is performed. Thereby, an image equal to an image obtained by performing exposure for an exposure time period (Texp1+Texp2) from an exposure start time point is displayed on the display section.

Furthermore, when the third divided exposure time period Texp3 has elapsed after the second pixel reading, third pixel reading is performed by starting application of a read pulse RD in synchronization with a vertical synchronizing signal VD, and a third piece of time-division bright-time image data A3 is acquired as image pickup data. Note that the mecha shutter is closed when reading of all pixels ends. The acquired piece of time-division bright-time image data A3 is added to the first and second pieces of time-division bright-time image data A1 and A2 (that is, a bright-time image data A=A1+A2+A3 is calculated) and displayed on the display section of the image pickup apparatus after necessary image processing is performed. Thereby, an image equal to an image obtained by performing exposure for the whole exposure time period Texp from the exposure start time point is displayed on the display section.

Immediately after such bright-time image pickup is performed, dark-time image pickup is performed without delay so that dark current having a correlation as high as possible with dark current at the time point of having picked up the bright-time image can be acquired.

The dark-time image acquisition is performed as shown in FIG. 25, and a process up to acquisition of image pickup data is similar to that of the live bulb photographing of the bright-time image except that image pickup is performed in a state of the mecha shutter being closed. However, time-division dark-time image data acquired by time-division exposure is not displayed on the display section unlike the pieces of time-division bright-time image data.

All pieces of time-division dark-time image data B1, B2 and B3 are acquired in this way, these are added together to calculate dark-time image data B=B1+B2+B3 equal to dark-time image data obtained by performing exposure for the whole exposure time period Texp from the exposure start time point. Then, by subtracting the dark-time image data B=B1+B2+B3 from the bright-time image data A=A1+A2+A3, image data for which a dark-current component has been reduced. After that, gain-up and other image processes are performed, and the image data is stored.

By such a process, it becomes possible to confirm a state of an image being formed during bulb photographing by a live view, and to acquire an image for which fixed pattern noise (FPN) has been reduced.

The live bulb photographing as described above is on the assumption of being performed with the image pickup apparatus being fixed by a tripod or the like because a long exposure time period is required.

In the case of performing the live bulb photographing as described above in a hand-held state without using a tripod or the like, image stabilization is thought to be indispensable.

The image stabilization is classified as mecha image stabilization in which a lens or an image pickup device is driven in an image stabilization direction and electronic image stabilization in which a part of an image is cut out so that a certain object part is always included, according to movement of an object image relative to an image pickup surface of the image pickup device.

Since the mecha image stabilization is such an image stabilization that is performed so that a position of an optical object image relative to an image pickup device is kept constant, it is possible to remove FPN by subtracting a dark-time image from a bright-time image as described above.

SUMMARY OF THE INVENTION

An image pickup apparatus according to a certain aspect of the present invention includes: a bright-time image pickup section picking up a formed object image by an image pickup device to acquire bright-time image data; a dark-time image pickup section shielding the image pickup device from light to acquire dark-time image data with a same exposure time period with which the bright-time image data is acquired; a shake detection section detecting a shake; an electronic image stabilization section cutting out cut-out bright-time image data for which the shake is corrected, from the bright-time image data, on the basis of the shake detected by the shake detection section; a dark-time image cut-out section cutting out cut-out dark-time image data at a same cut-out position as the cut-out bright-time image data, from the dark-time image data; and a dark current correction section generating corrected image data for which dark current is corrected, by subtracting the cut-out dark-time image data from the cut-out bright-time image data.

An image pickup method according to a certain aspect of the present invention includes: a bright-time image pickup step of picking up a formed object image by an image pickup device to acquire bright-time image data; a dark-time image pickup step of shielding the image pickup device from light to acquire dark-time image data with a same exposure time period with which the bright-time image data is acquired; a shake detection step of detecting a shake; an electronic image stabilization step of cutting out cut-out bright-time image data for which the shake is corrected, from the bright-time image data, on the basis of the shake detected by the shake detection step; a dark-time image cut-out step of cutting out cut-out dark-time image data at a same cut-out position as the cut-out bright-time image data, from the dark-time image data; and a dark current correction step of generating corrected image data for which dark current is corrected, by subtracting the cut-out dark-time image data from the cut-out bright-time image data.

BRIEF DESCRIPTION OF THE DRAWINGS

FIG. 25 is a timing chart showing an operation at the time of performing live-bulb photographing of a dark-time image conventionally.

DETAILED DESCRIPTION OF THE PREFERRED EMBODIMENTS

Embodiments of the present invention will be described below with reference to drawings.

First Embodiment

Figure 1:
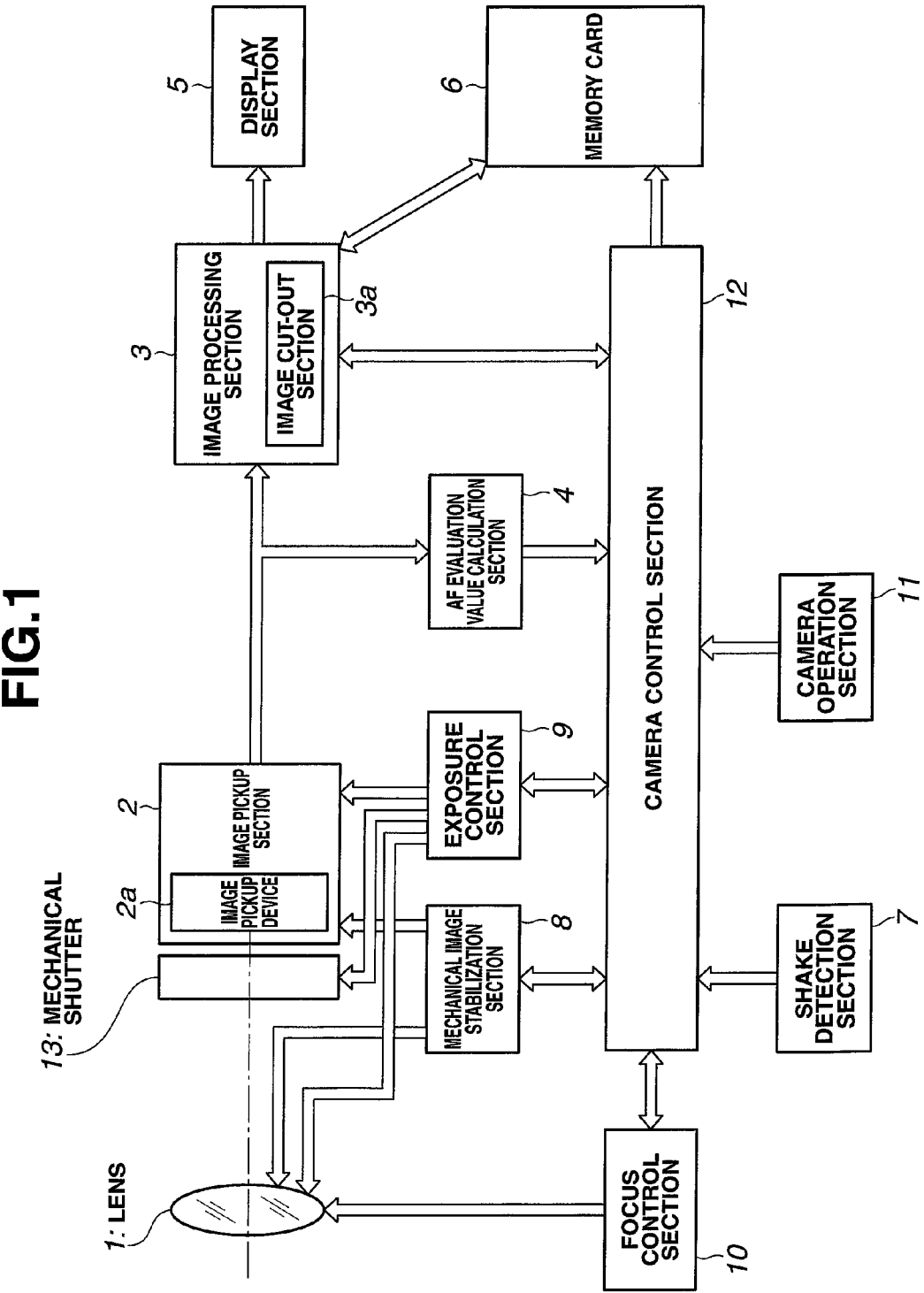
FIG. 1 is a block diagram showing a configuration of an image pickup apparatus in a first embodiment of the present invention.

FIGS. 1 to 21 show a first embodiment of the present invention, and FIG. 1 is a block diagram showing a configuration of an image pickup apparatus.

The image pickup apparatus is provided with a lens 1, an image pickup section 2, an image processing section 3, an AF evaluation value calculation section 4, a display section 5, a shake detection section 7, a mechanical image stabilization section 8, an exposure control section 9, a focus control section 10, a camera operation section 11, a camera control section 12 and a mechanical shutter 13 as shown in FIG. 1. Note that, though a memory card 6 is also shown in FIG. 1, the memory card 6 is not necessarily required to be in a configuration specific to the image pickup apparatus because the memory card 6 is configured to be attachable to and detachable from the image pickup apparatus.

The lens 1 forms an optical object image in an image pickup area of an image pickup device 2a included in the image pickup section 2. The lens 1 is provided with a focus lens, a zoom lens, a diaphragm and the like. In the present embodiment, the lens 1 is further provided with an image stabilization function.

The mechanical shutter 13 is arranged on an optical path from the lens 1 to the image pickup device 2a, and the mechanical shutter 13 controls passage of an object image through the image pickup device 2a and shielding of the image pickup device 2a from light.

The image pickup section 2 includes the image pickup device 2a which performs photoelectric conversion of an object image formed by the lens 1 and outputs it as an image signal, and a signal processing circuit which converts the image signal outputted from the image pickup device 2a to a digital signal after amplifying the image signal. Note that, in the present embodiment, the image pickup section 2 is configured to be movable within a plane perpendicular to a photographing optical axis of the lens 1 and is provided with an image stabilization function. The image pickup section 2 serves as both of a bright-time image pickup section which picks up a formed object image by the image pickup device 2a to acquire bright-time image data, and a dark-time image pickup section which shields the image pickup device 2a from light by the mechanical shutter 13 to acquire dark-time image data with a same exposure time period as an exposure time with which the bright-time image data has been acquired. In the present embodiment, the bright-time image data and the dark-time image data are acquired as pieces of time-division bright-time image data and pieces of time-division dark-time image data by performing time-division exposure on the basis of control by the camera control section 12 and the exposure control section 9.

The image processing section 3 performs various image processes, such as demosaicing, color correction, edge collection, color space conversion and gamma conversion, for an image signal outputted from the image pickup section 2. The image processing section 3 is provided with an image cut-out section 3a which cuts out a part of an image of a whole image pickup area of the image pickup device 2a. The image cut-out section 3a serves as both of an electronic image stabilization section which cuts out cut-out bright-time image data obtained by performing image stabilization of bright-time image data on the basis of a shake detected by the shake detection section 7, and a dark-time image cut-out section which cuts out cut-out dark-time image data at a same cut-out position as the cut-out bright-time image data, from dark-time image data. The image processing section 3 also functions as a dark current correction section which generates corrected image data for which dark current has been corrected, by subtracting the cut-out dark-time image data from the cut-out bright-time image data. Furthermore, the image processing section 3 also performs a process for adding pieces of image data acquired by time-division exposures together.

The AF evaluation value calculation section 4 calculates an AF evaluation value on the basis of an image signal outputted from the image pickup section 2 and outputs the AF evaluation value to the camera control section 12. That is, the image pickup apparatus is configured to perform auto-focusing, for example, by image plane phase difference AF or contrast AF. Note that, if the image plane phase difference AF is performed, the image pickup device 2a is also configured being provided with pixels for phase difference detection.

The display section 5 displays an image on the basis of an image signal which has been image-processed for display by the image processing section 3. The display section 5 is adapted to perform live view display (including live bulb display) and still image display as well as displaying various pieces of information and the like related to the image pickup apparatus.

The memory card 6 is a recording medium for storing an image signal which has been image-processed for recording by the image processing section 3.

The shake detection section 7 is configured being provided with an acceleration sensor and the like, and the shake detection section 7 detects a shake of the image pickup apparatus and outputs the shake to the camera control section 12.

The mechanical image stabilization section 8 mechanically corrects a relative deviation between the image pickup device 2a (more specifically, an cut-out area of the image pickup device 2a) and an object image on the basis of a shake detected by the shake detection section 7 and a position (a cut-out position) of a cut-out area of the image cut-out section 3a, under control of the camera control section 12. Specifically, the mechanical image stabilization section 8 reduces the deviation by moving at least one of the lens 1 and the image pickup device 2a so as to offset a shake vector which is a result of subtracting a vector at a position of cut-out by the image cut-out section 3a (a vector at a current cut-out position with a standard cut-out position as a criterion) from a vector of a shake detected by the shake detection section 7. Note that, though description is made below on the assumption that the image pickup device 2a is moved to reduce the deviation for simplification, the lens 1 may be moved to reduce the deviation, or both of movement of the image pickup device 2a and movement of the lens 1 may be used to reduce the deviation. The mechanical image stabilization section 8 is adapted to output a mecha image stabilization amount of the image pickup device 2a to the camera control section 12.

The exposure control section 9 controls the mechanical shutter 13 and a device shutter of the image pickup device 2a to acquire an image under control of the camera control section 12 on the basis of a shutter speed (an exposure time period) determined by the camera control section 12. The exposure control section 9 is adapted to perform control of the diaphragm included in the lens 1 and the like on the basis of a diaphragm value determined by the camera control section 12. The exposure control section 9 is also adapted to output driving information about the image pickup device 2a, the mechanical shutter 13 and the diaphragm to the camera control section 12.

The focus control section 10 drives the lens 1 to adjust a focus. That is, the focus control section 10 drives the focus lens included in the lens 1 to focus an object image formed on the image pickup device 2a on the basis of control by the camera control section 12 which has received an AF evaluation value from the AF evaluation value calculation section 4. The focus control section 10 is also adapted to output lens driving information such as a lens position to the camera control section 12.

The camera operation section 11 is an operation section for inputting various operations to the image pickup apparatus. The camera operation section 11 includes operation members such as a power switch for turning on/off a power source of the image pickup apparatus, a release button for inputting an instruction to perform still image photographing or motion picture photographing, a mode button for setting a photographing mode, a reproduction mode, a live view mode or the like, and the like. Here, photographing modes which can be set by the mode button are roughly classified as a still image photographing mode and a motion picture photographing mode. In the still image photographing mode, respective photographing modes, such as automatic, aperture priority, shutter speed priority, manual and bulb, can be further set. Live bulb photographing is executed, for example, in response to an input operation of the release button when the live view mode is set in the bulb photographing mode.

The camera control section 12 controls the whole image pickup apparatus including the image processing section 3, the memory card 6, the mechanical image stabilization section 8, the exposure control section 9, the focus control section 10 and the like on the basis of lens driving information from the focus control section 10, an AF evaluation value from the AF evaluation value calculation section 4, each piece of driving information from the exposure control section 9, a shake of the image pickup apparatus from the shake detection section 7, a mecha image stabilization amount from the mechanical image stabilization section 8, information from the image processing section 3, an operation input from the camera operation section 11 and the like. The camera control section 12 is also provided with an internal memory not shown to store each cut-out position of time-division cut-out bright-time image data to be described later.

Figure 2:
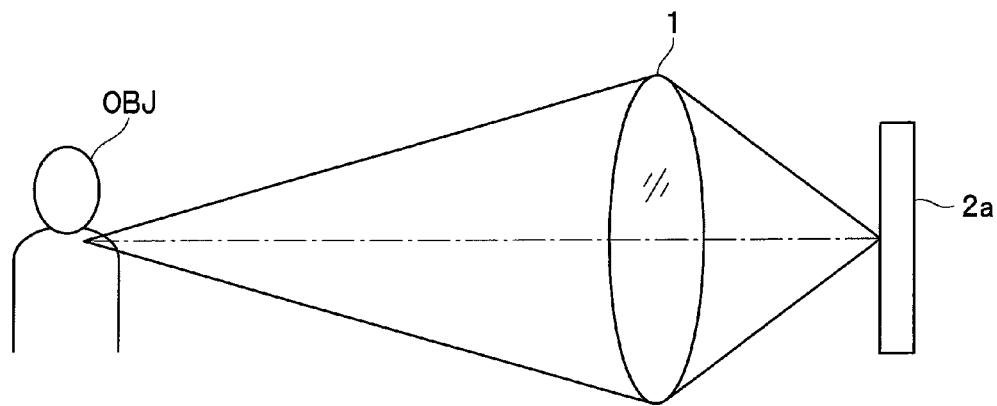
FIG. 2 is a diagram showing a state that an object image is formed on an image pickup device in the first embodiment.
Figure 3:
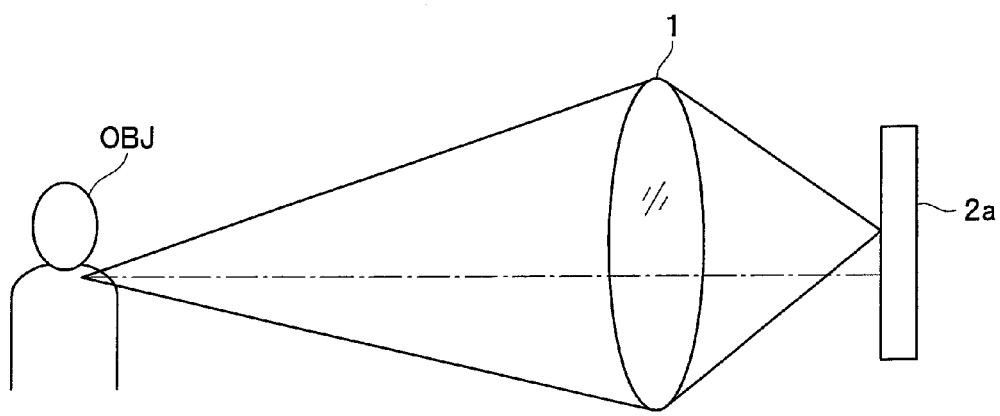
FIG. 3 is a diagram showing a state that an object image is formed on the image pickup device when the image pickup apparatus moves slightly to an upper left in comparison with FIG. 2, in the first embodiment.
Figure 4:
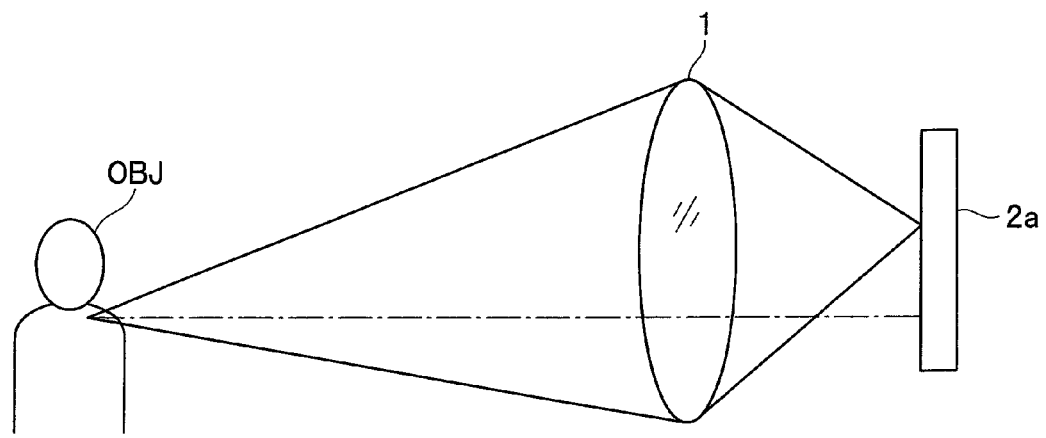
FIG. 4 is a diagram showing a state that an object image is formed on the image pickup device when the image pickup apparatus moves further to the upper left in comparison with FIGS. 2 and 3, in the first embodiment.
Figure 5:
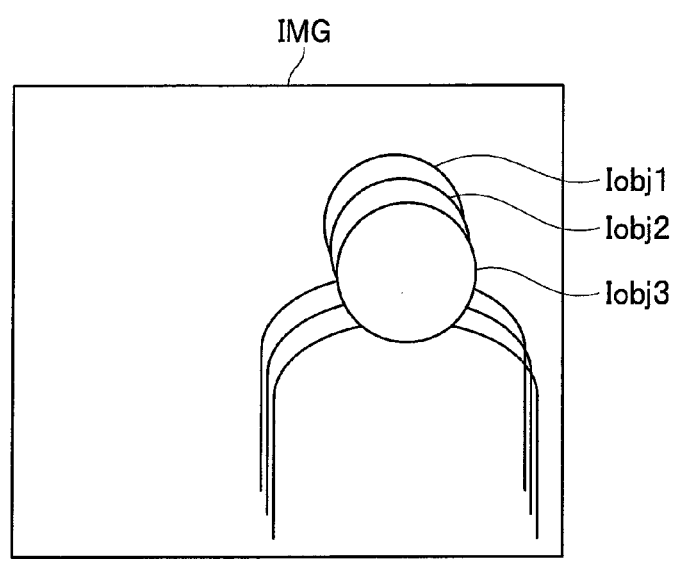
FIG. 5 is a diagram showing a state of an addition image obtained by adding time-division images picked up in the states of FIGS. 2 to 4, respectively, together in the first embodiment.

Next, description will be made on a blur of an object image in an image caused by a shake of the image pickup apparatus with reference to FIGS. 2 to 5. Here, FIG. 2 is a diagram showing a state that an object image is formed on the image pickup device 2a. FIG. 3 is a diagram showing a state that an object image is formed on the image pickup device 2a when the image pickup apparatus moves slightly to an upper left in comparison with FIG. 2. FIG. 4 is a diagram showing a state that an object image is formed on the image pickup device 2a when the image pickup apparatus moves further to the upper left in comparison with FIGS. 2 and 3. FIG. 5 is a diagram showing a state of an addition image obtained by adding time-division images picked up in the states of FIGS. 2 to 4, respectively, together.

First, it is assumed that an image at one point on an object OBJ is formed on a certain point on the image pickup device 2a by the lens 1 as shown in FIG. 2. Note that, in FIG. 2, a principal ray starting from the one point on the object OBJ, traveling through a center of an opening of the lens 1 and arriving at the image pickup device 2a is indicated by a one-dot chain line. (Note that one-dot chain lines shown in FIGS. 3 and 4 for comparison are also principal rays in a positional relationship shown in FIG. 2 (that is, they are not principal rays in positional relationships shown in FIGS. 3 and 4).

When the image pickup apparatus moves slightly to the upper left in comparison with the state shown in FIG. 2, the image at the one point on the object OBJ described above is formed at a slightly upper left position in comparison with FIG. 2 on an image pickup plane of the image pickup device 2a, as shown in FIG. 3.

When the image pickup apparatus moves further to the upper left in comparison with FIGS. 2 and 3, the image at the one point on the object OBJ described above is formed at the further upper left position in comparison with FIG. 3 on the image pickup plane of the image pickup device 2a, as shown in FIG. 4.

Therefore, since positions of electronic object images Iobj1 to Iobj3 in images picked up in the states of FIGS. 2 to 4, respectively, are different from one another, an addition image IMG obtained by addition is an image in which an object is blurred as shown in FIG. 5. Here, since the image pickup apparatus moves to the upper left, an object image within an image pickup range is shown being deviated to a lower right as shown in FIG. 5.

Figure 6:
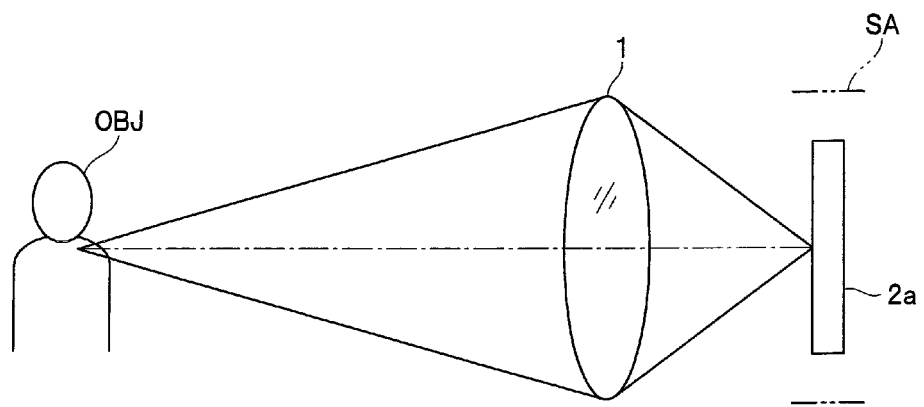
FIG. 6 is a diagram showing an initial state of mecha image stabilization corresponding to FIG. 2 in the first embodiment.
Figure 7:
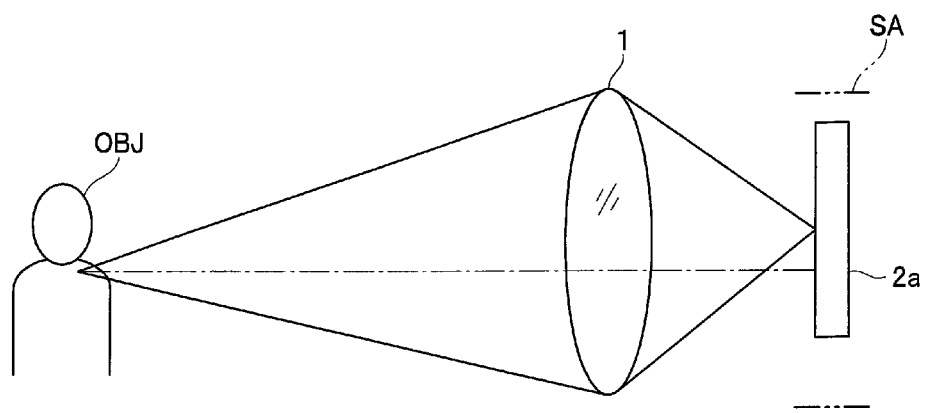
FIG. 7 is a diagram showing a state at the time of moving the image pickup device slightly to the upper left according to FIG. 3 to perform mecha image stabilization in the first embodiment.
Figure 8:
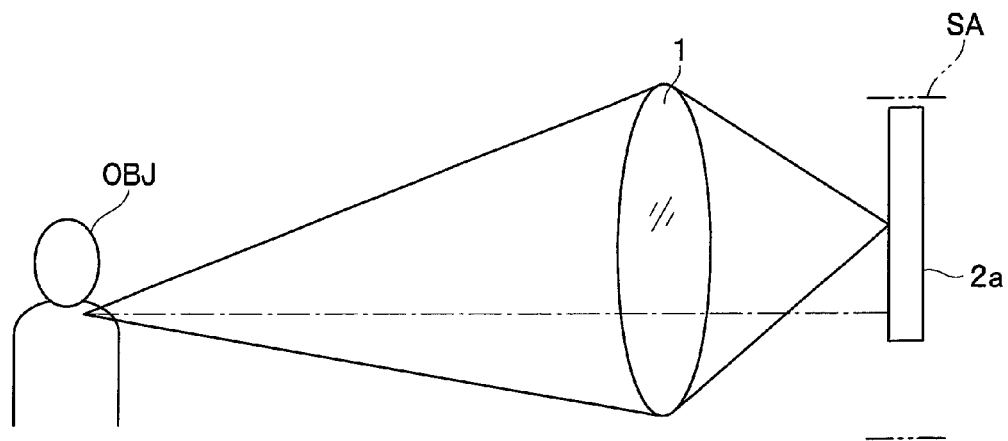
FIG. 8 is a diagram showing a state at the time of moving the image pickup device, further to the upper left according to FIG. 4 to perform mecha image stabilization in the first embodiment.
Figure 9:
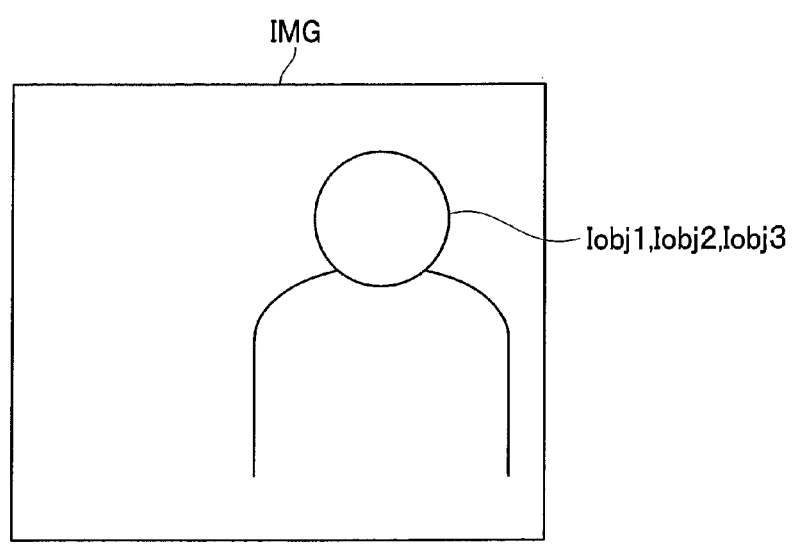
FIG. 9 is a diagram showing a state of an addition image obtained by adding time-division images picked up in the states of FIGS. 6 to 8, respectively, together in the first embodiment.

Next, description will be made on a case of driving the image pickup device 2a by the mechanical image stabilization section 8 to perform image stabilization with reference FIGS. 6 to 9. Here, FIG. 6 is a diagram showing an initial state of mecha image stabilization corresponding to FIG. 2. FIG. 7 is a diagram showing a state at the time of moving the image pickup device 2a slightly to the upper left according to FIG. 3 to perform mecha image stabilization. FIG. 8 is a diagram showing a state at the time of moving the image pickup device 2a further to the upper left according to FIG. 4 to perform mecha image stabilization. FIG. 9 is a diagram showing a state of an addition image obtained by adding time-division images picked up in the states of FIGS. 6 to 8, respectively, together. Note that, in FIGS. 6 to 8, a sensor shift/movement range SA of the image pickup device 2a is indicated by a two-dot chain line. Because FIGS. 6 to 8 are schematic diagrams seen from a lateral direction, nothing is clearly shown about a horizontal direction. However, the image pickup section 2 can move in the horizontal direction also, and a sensor/shift movement range SA also exists in the horizontal direction similarly to a vertical direction.

The initial state shown in FIG. 6 is a state at a time point of starting mecha image stabilization, and the image pickup device 2a has not been shifted yet and is positioned at a center of the sensor shift/movement range SA.

In the state shown in FIG. 7, the image pickup device 2a is shifted to an upper left position of the sensor shift/movement range SA in order to cause the object image which has moved in the upper left direction of the image pickup plane as shown in FIG. 3 to be formed at a same position as the position of the object image on the image pickup plane shown in FIG. 6.

In the state shown in FIG. 8, the image pickup device 2a is shifted to a further upper left position of the sensor shift/ movement range SA in order to cause the object image which has further moved in the upper left direction of the image pickup plane as shown in FIG. 4 to be formed at a same position as the position of the object image on the image pickup plane shown in FIG. 6.

Since positions of the object images Iobj1 to Iobj3 in the images picked up in the states of FIGS. 6 to 8, respectively, become almost the same in this way, the addition image IMG obtained by addition is an image in which the blur of the object image is reduced as shown in FIG. 9.

Figure 10:
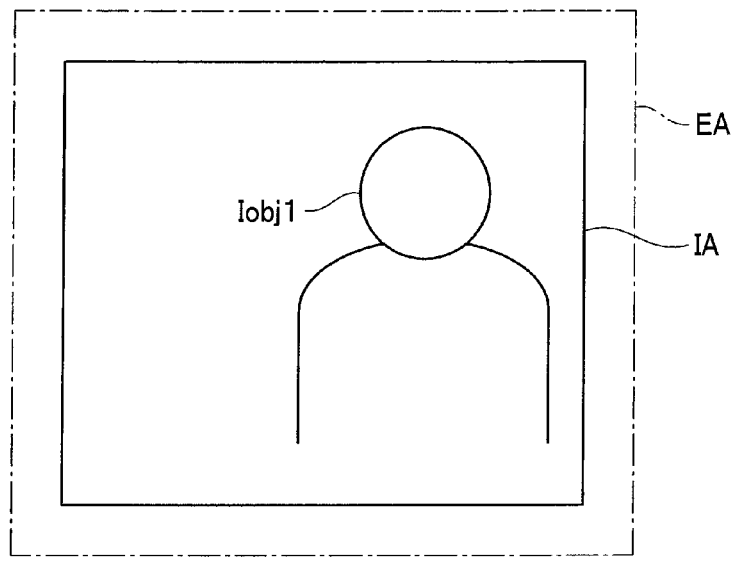
FIG. 10 is a diagram showing a state of a blur of an object image in an image corresponding to FIG. 2 in the first embodiment.
Figure 11:
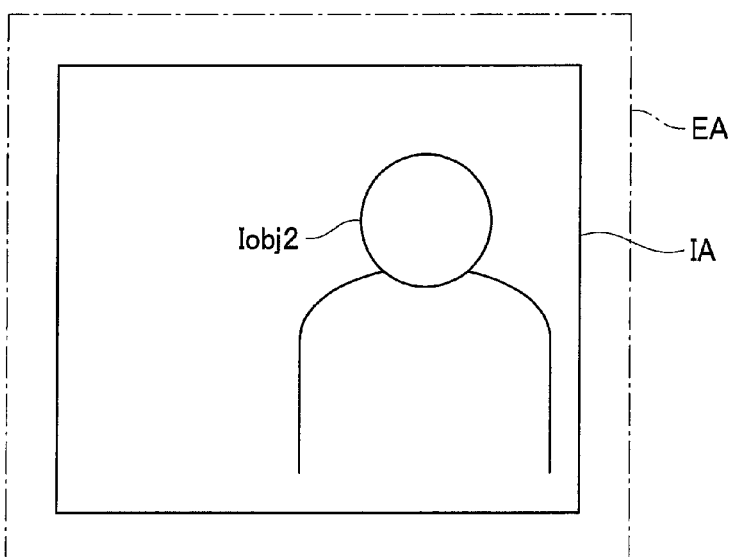
FIG. 11 is a diagram showing a state of a blur of an object image in an image corresponding to FIG. 3 in the first embodiment.
Figure 12:
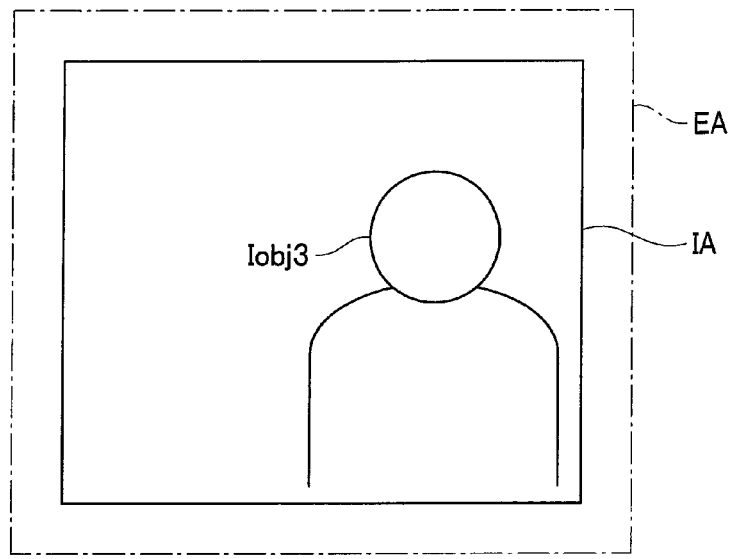
FIG. 12 is a diagram showing a state of a blur of an object image in an image corresponding to FIG. 4 in the first embodiment.

Next, description will be made on a blur of an object image in an image caused by a shake of the image pickup apparatus in the case of cutting out an image, with reference to FIGS. 10 to 12. FIG. 10 is a diagram showing a state of a blur of an object image in an image corresponding to FIG. 2. FIG. 11 is a diagram showing a state of a blur of an object image in an image corresponding to FIG. 3. FIG. 12 is a diagram showing a state of a blur of an object image in an image corresponding to FIG. 4. Note that, in FIGS. 10 to 12 and FIGS. 13 to 15 to be described later, a whole image pickup area of the image pickup device 2a is denoted by EA, and a cut-out area is denoted by IA.

In FIGS. 10 to 12, since image stabilization is not performed, the cut-out area IA at a standard cut-out position whose center is the same as a center of the whole image pickup area EA is not changed. Therefore, positions of the object images Iobj1 to Iobj3 in FIGS. 10 to 12 are the same as the positions in FIGS. 2 to 4 (see FIG. 5), and it is an only different point that an image in a state of being slightly zoomed up by electronic zoom is obtained because the cut-out area IA is used as a recorded image or a display image. Therefore, an addition image by adding the cut-out areas IA of FIGS. 10 to 12 together is similar to the image with a blurred object as shown in FIG. 5 except the point that the addition image is slightly zoomed up.

Figure 13:
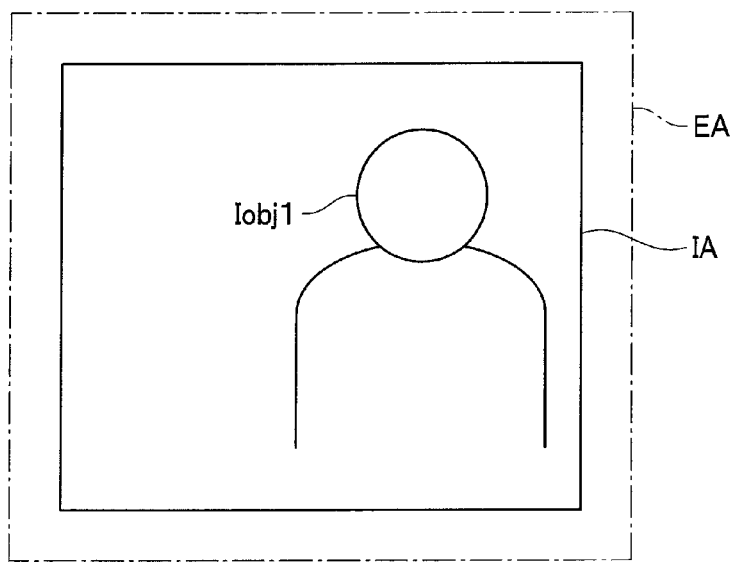
FIG. 13 is a diagram showing an initial state of electronic image stabilization corresponding to FIG. 10 in the first embodiment.
Figure 14:
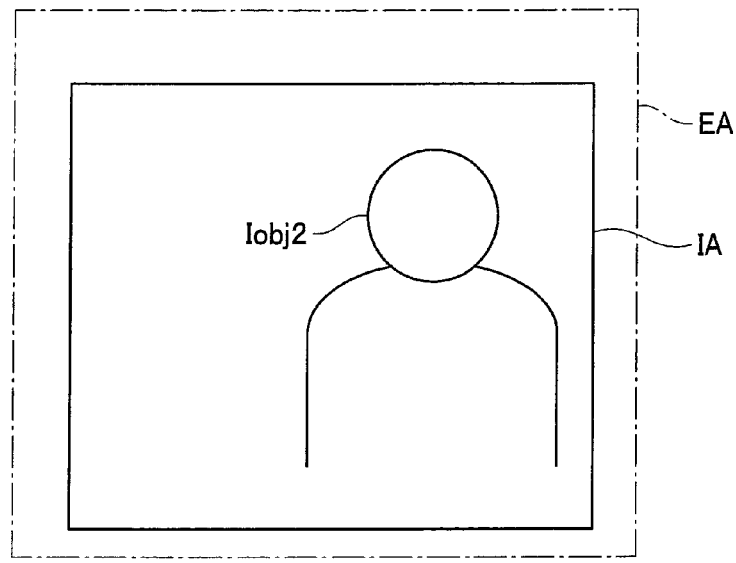
FIG. 14 is a diagram showing a state at the time of moving a cut-out area slightly to a lower right according to FIG. 11 to perform electronic image stabilization in the first embodiment.
Figure 15:
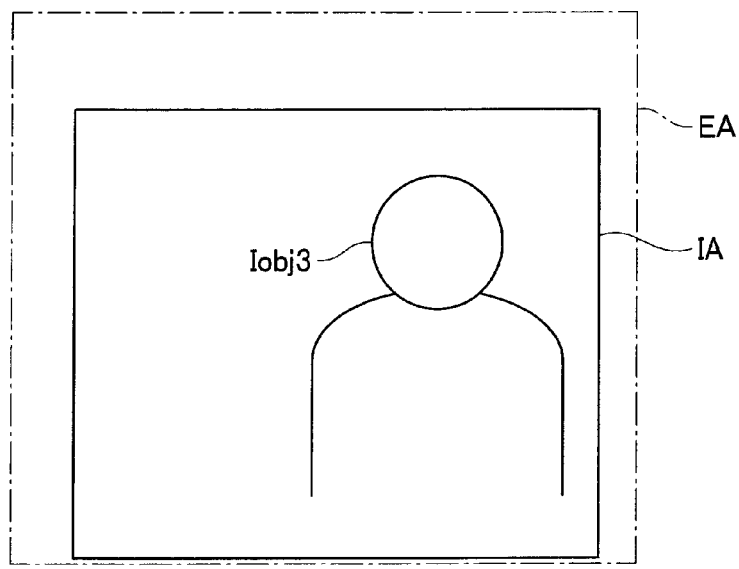
FIG. 15 is a diagram showing a state at the time of moving the cut-out area further to the lower right according to FIG. 12 to perform electronic image stabilization in the first embodiment.

Next, description will be made on a case of performing image stabilization by the image cut-out section 3a which functions as an electronic image stabilization section with reference to FIGS. 13 to 15. Here, FIG. 13 is a diagram showing an initial state of electronic image stabilization corresponding to FIG. 10. FIG. 14 is a diagram showing a state at the time of moving the cut-out area IA slightly to a lower right according to FIG. 11 to perform electronic image stabilization. FIG. 15 is a diagram showing a state at the time of moving the cut-out area IA further to the lower right according to FIG. 12 to perform electronic image stabilization.

In FIGS. 13 to 15, the cut-out area IA is shifted so that the positions of the object images Iobj1 to Iobj3 in the cut-out area IA are the same, according to movements of the object images Iobj1 to Iobj3 in the whole image pickup area EA corresponding to FIGS. 10 to 12. Such an addition image obtained by adding the cut-out areas IA of FIGS. 13 to 15 together is similar to the image in which the blur of an object image is reduced, as shown in FIG. 9, except the point that the addition image is slightly zoomed up.

In the present embodiment, by combining mechanical image stabilization by the mechanical image stabilization section 8 and electronic image stabilization by the image cut-out section 3a as described above, powerful image stabilization is realized, and live bulb photographing with long-time-period exposure is performed.

Figure 16:
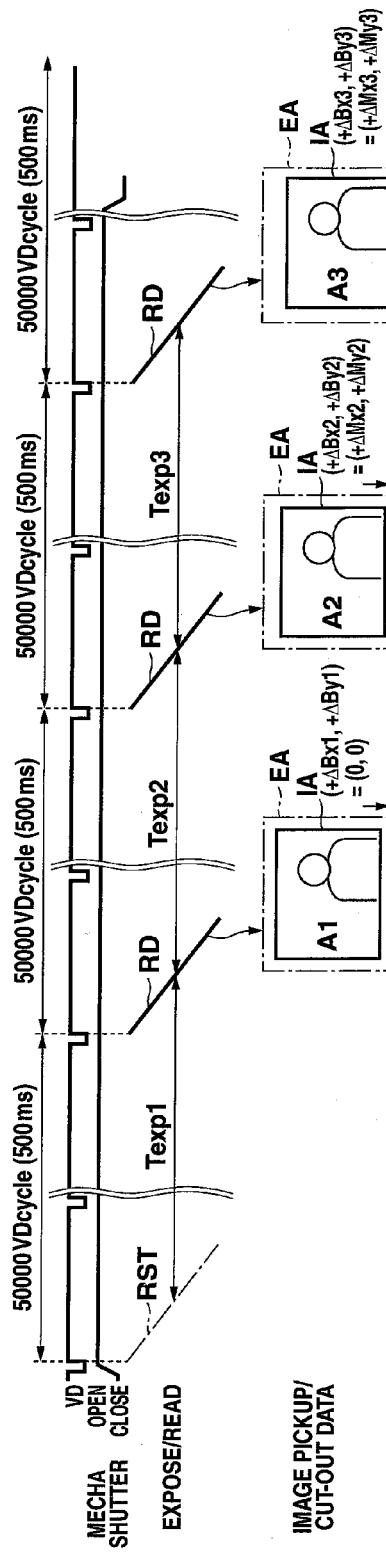
FIG. 16 is a timing chart showing an operation at the time of performing live-bulb photographing of a bright-time image in the first embodiment.
Figure 17:
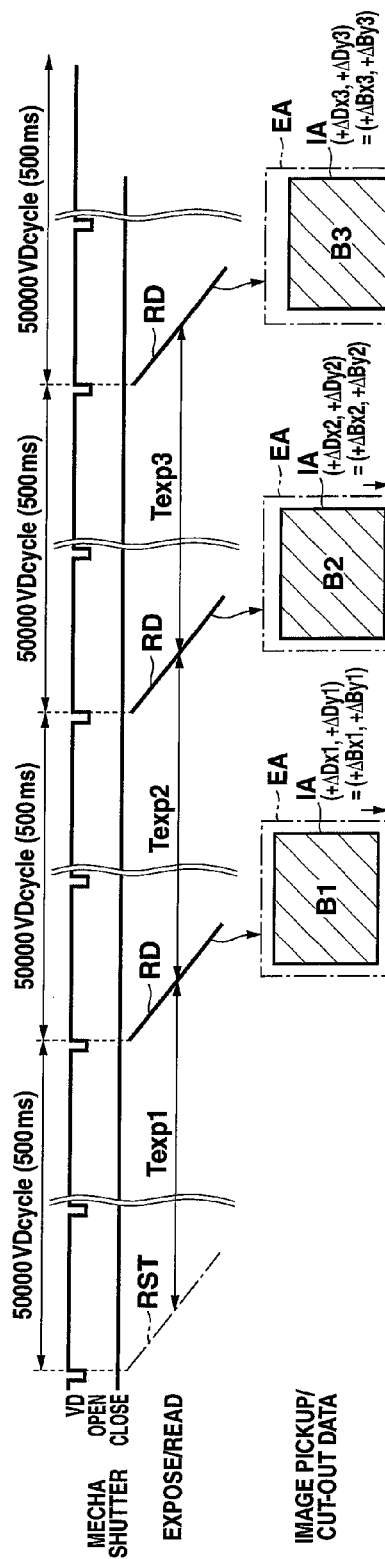
FIG. 17 is a timing chart showing an operation at the time of performing live-bulb photographing of a dark-time image in the first embodiment.
Figure 18:
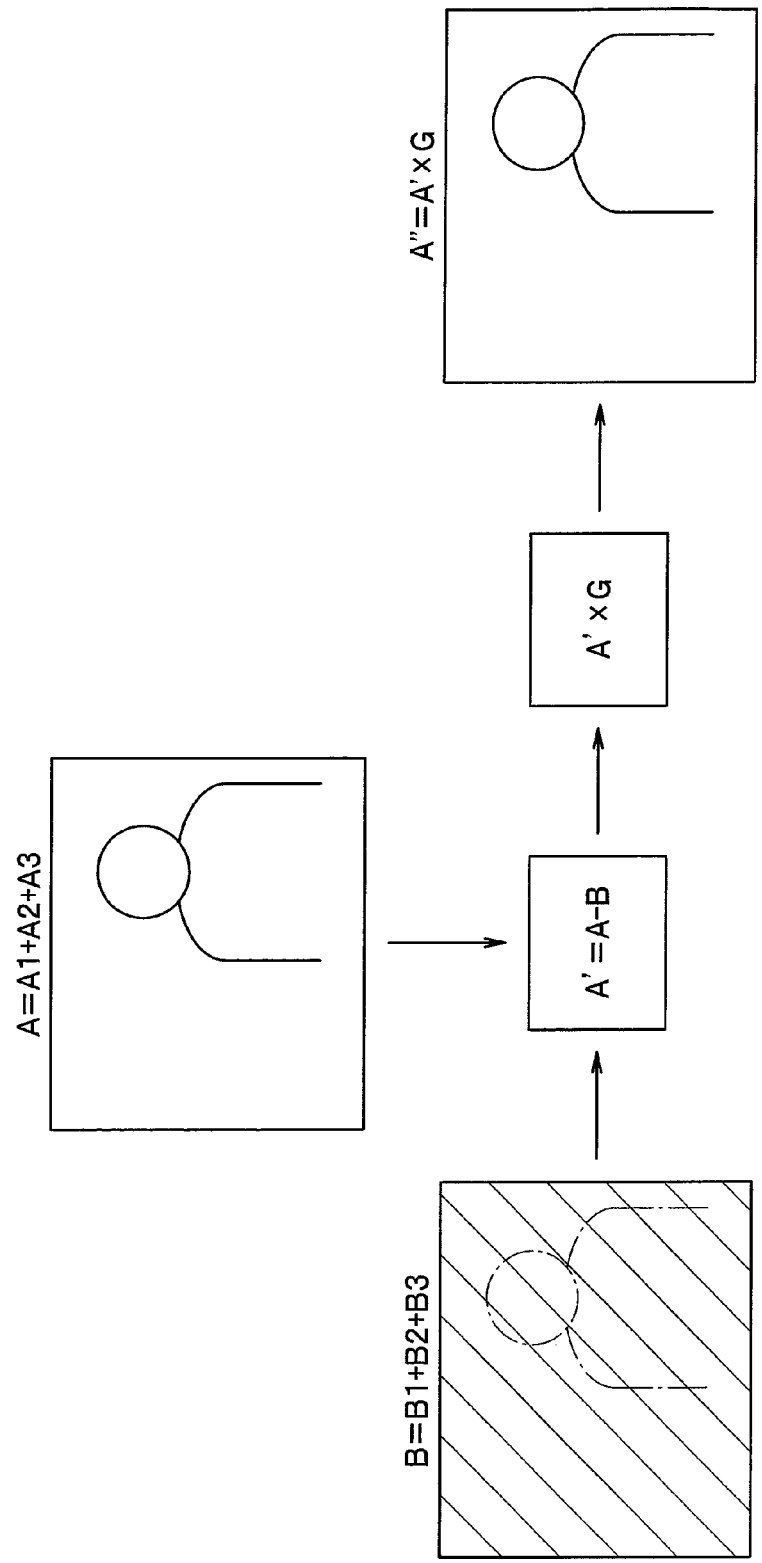
FIG. 18 is a diagram showing a state of generating corrected image data for which dark current has been corrected on the basis of time-division cut-out bright-time image data and time-division cut-out dark-time image data, in the first embodiment.
Figure 19:
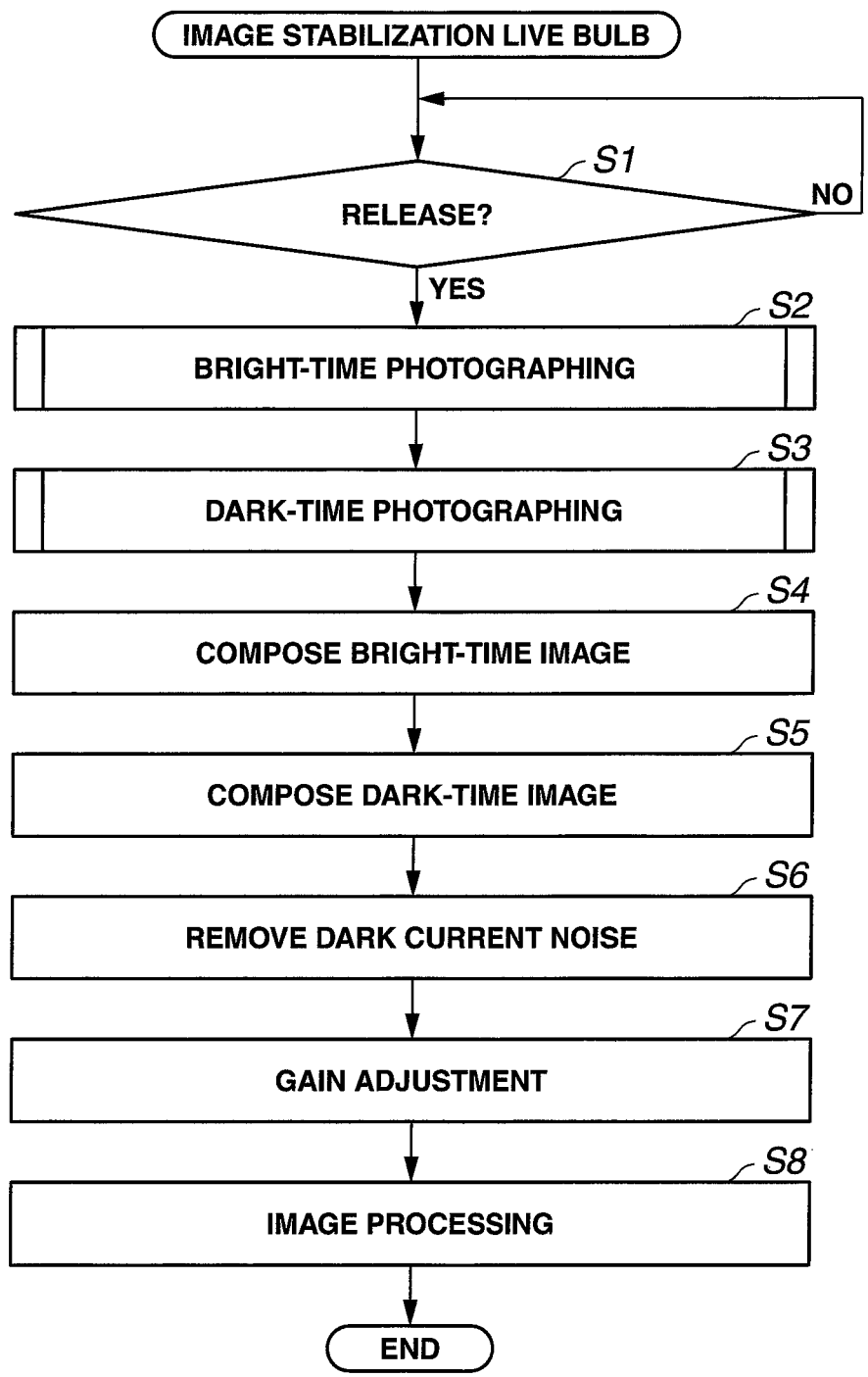
FIG. 19 is a flowchart showing an image-stabilization live-bulb process in the first embodiment.
Figure 20:
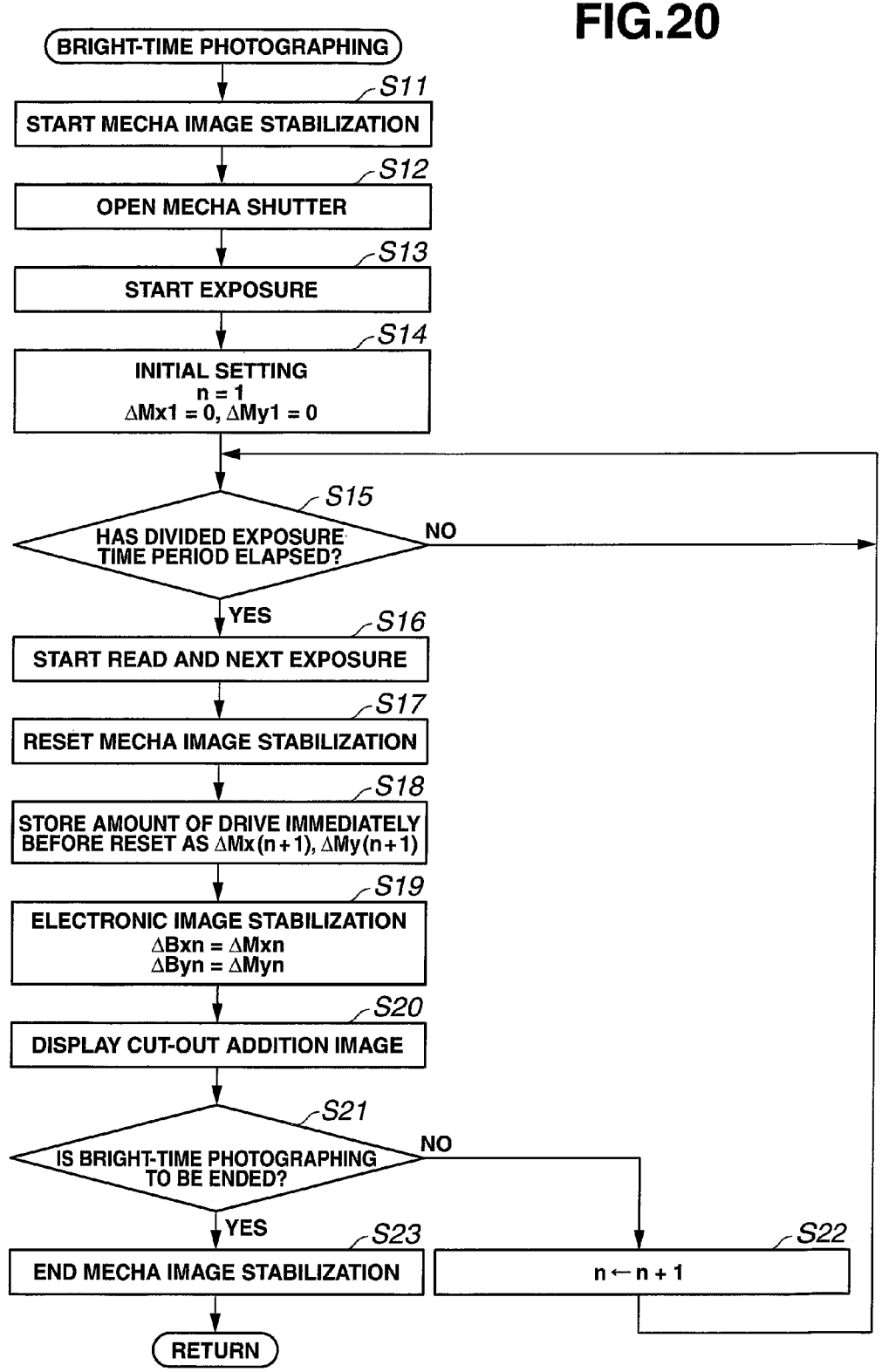
FIG. 20 is a flowchart showing a bright-time photographing process at step S2 in FIG. 19 in the first embodiment.
Figure 21:
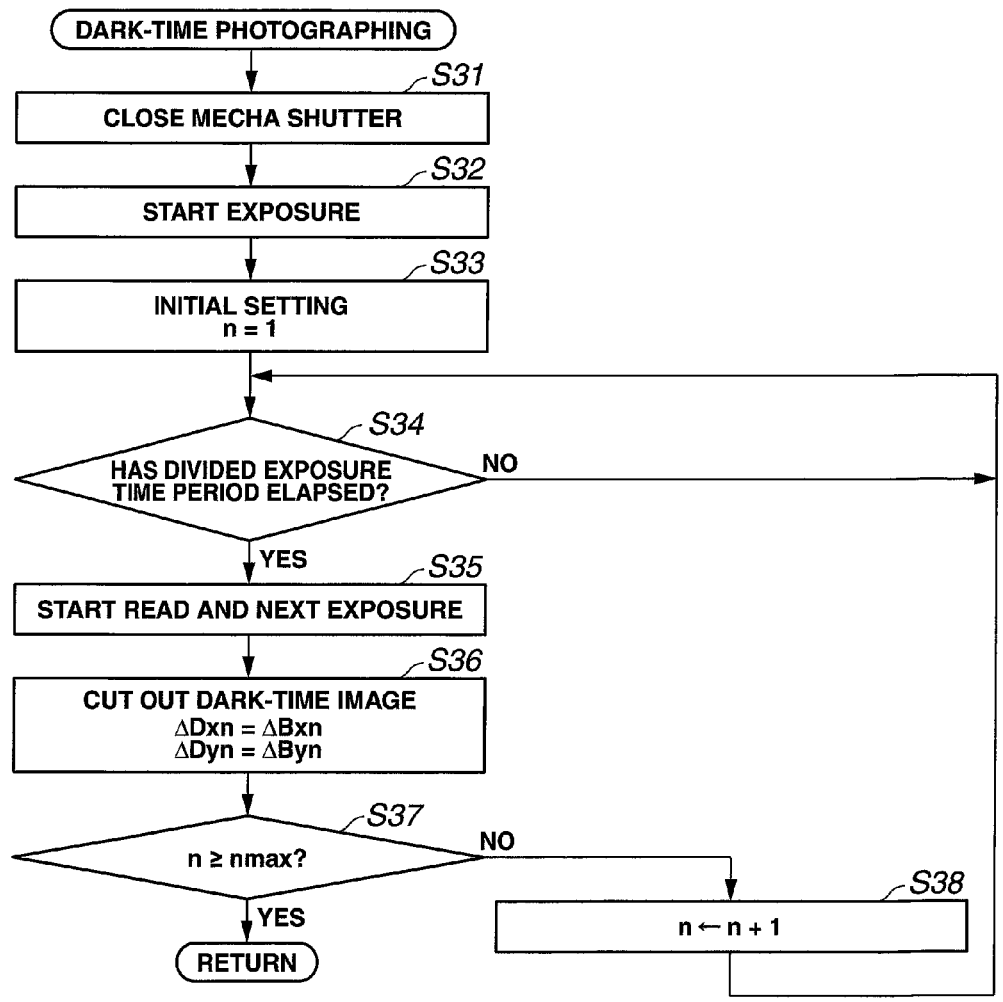
FIG. 21 is a flowchart showing a dark-time photographing process at step S3 in FIG. 19 in the first embodiment.

Such live bulb photographing will be described with reference to FIGS. 16 to 21. Here, FIG. 16 is a timing chart showing an operation at the time of performing live-bulb photographing of a bright-time image. FIG. 17 is a timing chart showing an operation at the time of performing live-bulb photographing of a dark-time image. FIG. 18 is a diagram showing a state of generating corrected image data for which dark current has been corrected on the basis of time-division cut-out bright-time image data and time-division cut-out dark-time image data. FIG. 19 is a flowchart showing an image-stabilization live-bulb process. FIG. 20 is a flowchart showing a bright-time photographing process at step S2 in FIG. 19. FIG. 21 is a flowchart showing a dark-time photographing process at step S3 in FIG. 19.

As shown in FIG. 19, when the image pickup apparatus is set to the live bulb photographing mode, and the image stabilization live bulb process is started, it is waited that start of live bulb photographing is specified by the release button of the camera operation section 11 (step S1).

Here, when a release operation is performed, a bright-time photographing process shown in FIG. 20 is performed (step S2). The bright-time photographing process is a process for acquiring bright-time image data as multiple pieces of time-division bright-time image data for which an exposure time period is divided into multiple divided exposure time periods and cutting out time-division cut-out bright-time image data for which a shake has been corrected, for each piece of time-division bright-time image data.

When the bright-time photographing process starts, mecha image stabilization by the mechanical image stabilization section 8 is started first (step S11).

Next, as shown in FIG. 16, the mechanical shutter 13 is opened (step S12), and exposure is started by starting application of a reset pulse RST in synchronization with a vertical synchronizing signal VD (step S13). Note that, though FIG. 16 shows an example of rolling read in which the reset pulse RST is sequentially applied for each line, batch read is, of course, possible.

Then, 1 is set to a counter n counting the number of times of divided exposure, and initial settings are made, such as setting 0 to each of mecha image stabilization amounts related to first time-division exposure (a horizontal-direction image stabilization amount $\Delta$Mx1 and a vertical-direction image stabilization amount $\Delta$My1) (step S14). The initial values of the mecha image stabilization amounts are stored in the internal memory of the camera control section 12 as an image stabilization amount operation profile to be used for a later-stage dark-time photographing.

Then, it is waited that a divided exposure time period Texpn (in an example shown in FIG. 16, a time period corresponding to n-th divided exposure among Texp1 to Texp3) elapses (step S15). Since the mechanical image stabilization section 8 operates and mecha image stabilization is continuously performed even while the divided exposure time period Texpn is passing, a blur in an image being exposed is reduced.

When the divided exposure time period Texpn has elapsed, reading of pixels related to n-th time-division exposure is performed by starting application of a read pulse RD in synchronization with a vertical synchronizing signal VD, and a next (that is, (n+1)th) time-division exposure for pixels after the reading is started (step S16).

It is a piece of time-division bright-time image data of the whole image pickup area EA related to the n-th time-division exposure that is read as image pickup data at step S16.

When the process of step S16 is performed, the mechanical image stabilization section 8 is reset and returned to an initial position (step S17), and an amount of drive of the mechanical image stabilization section 8 immediately before the reset is stored into the internal memory of the camera control section 12 as mecha image stabilization amounts ($\Delta$Mx(n+1), $\Delta$My(n+1)) to be used as a cut-out position in next time-division exposure further, to be used in later-stage dark-time photographing (step S18). The mecha image stabilization amounts ($\Delta Mx(n+1)$, $\Delta My(n+1)$) are also the image stabilization amount operation profile described above.

Such a process is performed for a following reason. If it is attempted to perform real-time image stabilization by electronic image stabilization, it is required to perform time-division reading of images with a time interval sufficiently shorter than a shake cycle as a time-division exposure time period. Therefore, the number of times of reading increases, and both of power consumption and read noise increase. Thus, real-time image stabilization is performed by the mechanical image stabilization section 8, and the mechanical image stabilization section 8 is reset and returned to the initial position each time one piece of time-division bright-time image data is acquired (that is, at a time point of starting each time-division exposure) so that the mechanical image stabilization section 8 can exert its function sufficiently during each time-division exposure. As for the mecha image stabilization amounts for which the mecha image stabilization has been responsible immediately before the reset, electronic image stabilization is to be responsible therefor. Thereby, merits of mechanical image stabilization and merits of electronic image stabilization are well combined so that it becomes possible to perform powerful image stabilization in real time without increasing power consumption or read noise.

In this way, by setting an image cut-out position ($\Delta Bxn$, $\Delta Byn$), which is an amount of drive of the mechanical image stabilization section 8 related to the n-th time-division exposure, to the mecha image stabilization amounts ($\Delta Mx1$, $\Delta My1$) initially set at step S14 in the case of and to mecha image stabilization amounts ($\Delta Mxn$, $\Delta Myn$) immediately before (n−1)th time-division exposure ends in the case of n≥2, electronic image stabilization is performed in which time-division cut-out bright-time image data An of the cut-out area IA (in the example shown in FIG. 16, time-division cut-out bright-time image data corresponding to n-th divided exposure among A1 to A3) is cut out from pieces of time-division bright-time image data of the whole image pickup area EA (step S19). Here, ($\Delta Bxn$, $\Delta Byn$) is a difference value cut-out position relative to a previous cut-out position. That is, a cut-out position is cut out, being deviated from the previous cut-out position by ($\Delta Bxn$, $\Delta Byn$). However, it goes without saying that, if there is a difference in a system of units or the like, for example, the image cut-out position is in units of pixels, and the mecha image stabilization amounts are in units of micrometers, multiplication by an appropriate constant is performed. At this time, a cut-out position of the time-division cut-out bright-time image data An is a position corresponding to the amount of drive of the mechanical image stabilization section 8 immediately before the (n−1)th time-division exposure ends and the mechanical image stabilization section 8 is reset.

Then, by the image processing section 3, the time-division cut-out bright-time image data An which has been cut out is added to pieces of time-division cut-out bright-time image data A1 to A(n−1) which have been acquired in the past; image processing for display is performed therefor; and a result is displayed on the display section 5 (step S20). By performing such a process, an image equal to an image obtained by performing exposure for an exposure time period (Texp1+ . . . +Texpn) from an exposure start time point is displayed on the display section, and it becomes possible to confirm a state of an image being formed during bulb photographing by a live view. Furthermore, the displayed image is such that a blur is reduced.

After that, it is judged whether the bright-time photographing process is to be ended or not on the basis of whether or not the release button has transitioned to, for example, a state of not being pressed or the like (step S21).

Here, if the bright-time photographing process is not to be ended, the value of n is increased by one (step S22), and then the flow returns to step S15, where the process as described above is repeated.

If it is judged at step S21 that the bright-time photographing process is to be ended, the value of the counter n is set to a maximum counter number nmax for bright-time photographing and stored into the internal memory of the camera control section 12, and driving of the mechanical image stabilization section 8 is stopped to end the mecha image stabilization started at step S11 in order to reduce power consumption (step S23). Then, the flow returns to the image stabilization live bulb process shown in FIG. 19. Here, to end the bright-time photographing is specified by operating the release switch, and a divided exposure time period is determined at the timing of the release operation. Therefore, in general, a last divided exposure time period is different from other divided exposure time periods.

When the flow returns the process in FIG. 19 again, a dark-time photographing process shown in FIG. 21 is performed (step S3). The dark-time photographing process is a process for acquiring pieces of time-division dark-time image data by dividing the exposure time period into the same multiple divided exposure time periods as those for the multiple pieces of time-division bright-time image data acquired by the process of step S2, and cutting out time-division cut-out dark-time image data at a same cut-out position as that of the time-division cut-out bright-time image data for each of the pieces of time-division dark-time image data constituting dark-time image data corresponding to the pieces of time-division bright-time image data, respectively.

When the dark-time photographing process starts, the mechanical shutter 13 is closed first as shown at a right end of FIG. 16 (step S31). Therefore, the mechanical shutter 13 remains closed in FIG. 17 also.

By starting application of a reset pulse RST in synchronization with a vertical synchronizing signal VD in the dark-time state, exposure is started (step S32).

Next, initial settings are made, such as setting 1 to the counter n for counting the number of times of divided exposure (step S33).

Next, it is waited that the same divided exposure time period Texpn as the bright-time photographing elapses in n-th time-division exposure (step S34).

When the divided exposure time period Texpn has elapsed, reading of pixels related to n-th time-division exposure is performed by starting application of a read pulse RD in synchronization with a vertical synchronizing signal VD, and a next (that is, the (n+1)th) time-division exposure for pixels after the reading is started (step S35).

After the process of step S35 is performed, an image cut out position ($\Delta Dxn$, $\Delta Dyn$) related to the n-th time-division exposure of the dark-time photographing is set to the image cut-out position ($\Delta Bxn$, $\Delta Byn$) related to the n-th time-division exposure of the bright-time photographing, that is, the mecha image stabilization amounts ($\Delta Mxn$, $\Delta Myn$) stored in the internal memory of the camera control section 12 as the image stabilization amount operation profile for electronic image stabilization at the time of bright-time photographing at steps S14 and S18 in FIG. 20, and dark-time image cut-out for cutting out a piece of time-division cut-out dark-time image data Bn of the cut-out area IA (in an example shown in FIG. 17, a piece of time-division dark-time image data corresponding to n-th divided exposure among B1 to B3) from pieces of time-division dark-time image data of the whole image pickup area EA is performed (step S36). Here, (ΔDxn, ΔDyn) is a difference value cut-out position relative to a previous cut-out position. That is, a cut-out position is deviated from the previous cut-out position by (ΔDxn, ΔDyn) to perform cut-out.

After that, it is judged whether the dark-time photographing process is to be ended or not on the basis of whether or not the counter n has reached the maximum counter number nmax for bright-time photographing (step S37).

Here, if the dark-time photographing process is not to be ended, the value of n is increased by one (step S38), and then the flow returns to step S34, where the process as described above is repeated.

If it is judged at step S37 that the dark-time photographing process is to be ended, the flow returns to the image stabilization live bulb process shown in FIG. 19.

When the flow returns to the process in FIG. 19 again, addition bright-time image data A of a whole exposure time period Texp=(Texp1+Texp2+ . . . +Texpnmax) is calculated as A=A1+A2+ . . . +Anmax by adding pieces of time-division cut-out bright-time image data A1 to Anmax together, as shown in FIG. 18 (step S4).

Similarly, addition dark-time image data B of the whole exposure time period Texp=(Texp1+Texp2+ . . . +Texpnmax) is calculated as B=B1+B2+ . . . +Bnmax by adding pieces of time-division cut-out dark-time image data B1 to Bnmax together, as shown in FIG. 18 (step S5). Note that, though an object image is indicated by one-dot chain line in the addition dark-time image data B, the object image is shown for reference and is not actually exposed.

Then, the image processing section 3 which functions as the dark current correction section calculates corrected image data A' from which dark current noise has been removed as A'=A−B by subtracting the addition dark-time image data B from the addition bright-time image data A (step S6). Here, the "removal of dark current noise" includes not only a case of completely removing dark current noise but also a case of removing a part of dark current noise and can be also referred to as "decrease (reduction) of dark current noise".

Note that, though the corrected image data A' from which dark current noise has been removed is calculated after addition of the pieces of time-division cut-out bright-time image data A1 to Anmax and addition of the pieces of time-division cut-out dark-time image data B1 to Bnmax are performed separately, calculation order is not limited thereto, and the calculation may be performed in any order if a same result can be obtained. For example, by calculating the pieces of time-division bright-time image data from which dark current noise has been removed as (A1−B1), (A2−B2), . . . , (Anmax−Bnmax) first and then adding the pieces of data together, the corrected image data A' from which dark current noise has been removed may be obtained.

After that, the corrected image data A' is multiplied by gain G to calculate amplified corrected image data A" as shown in FIG. 18 (step S7). Various kinds of image processes are performed therefor by the image processing section 3, and the corrected image data A" is recorded to the memory card 6. Otherwise, an obtained image is displayed on the display section 5 as a photographing result (step S8). Then, the image stabilization live bulb process ends.

According to the first embodiment as described above, since a bright-time image is photographed and displayed by time division, it becomes possible to confirm a state of the image being formed during bulb photographing by a live view.

Mechanical image stabilization reaches limits when the mecha image stabilization amount reaches a boundary of the sensor shift/movement range SA, and electronic image stabilization reaches limits when the cut-out area IA reaches a boundary of the whole image pickup area EA. However, since the mechanical image stabilization and the electronic image stabilization are combined, it becomes possible to realize powerful image stabilization and respond to a hand-held photographing. In addition, according to the configuration of the present embodiment, it is possible to suppress increase in cost and increase in size of the image pickup apparatus unlike a case of realizing powerful image stabilization only by the mechanical image stabilization.

Furthermore, because real-time image stabilization during divided exposure is performed by mechanical image stabilization, and the mechanical image stabilization is reset each time one divided exposure ends so that electronic image stabilization is responsible for the mecha image stabilization amounts immediately before the reset, it is not necessary to perform real-time image stabilization by electronic image stabilization, and it is possible to suppress increase in power consumption and read noise.

Furthermore, since a dark-time image is subtracted from a bright-time image, it is possible to obtain an image from which dark current noise has been removed.

At this time, a cut-out position of electronic image stabilization of the bright-time image is stored so that cut-out from the same cut-out position as the bright-time image is performed for the dark-time image also. Thereby, positions of fixed pattern noise (FPN) of the bright-time image and the dark-time image are not deviated from each other, so that it becomes possible to perform high-accuracy correction.

Thus, it becomes possible to realize hand-held live bulb photographing at a low cost without increasing the size of the image pickup apparatus.

Second Embodiment

Figure 22:
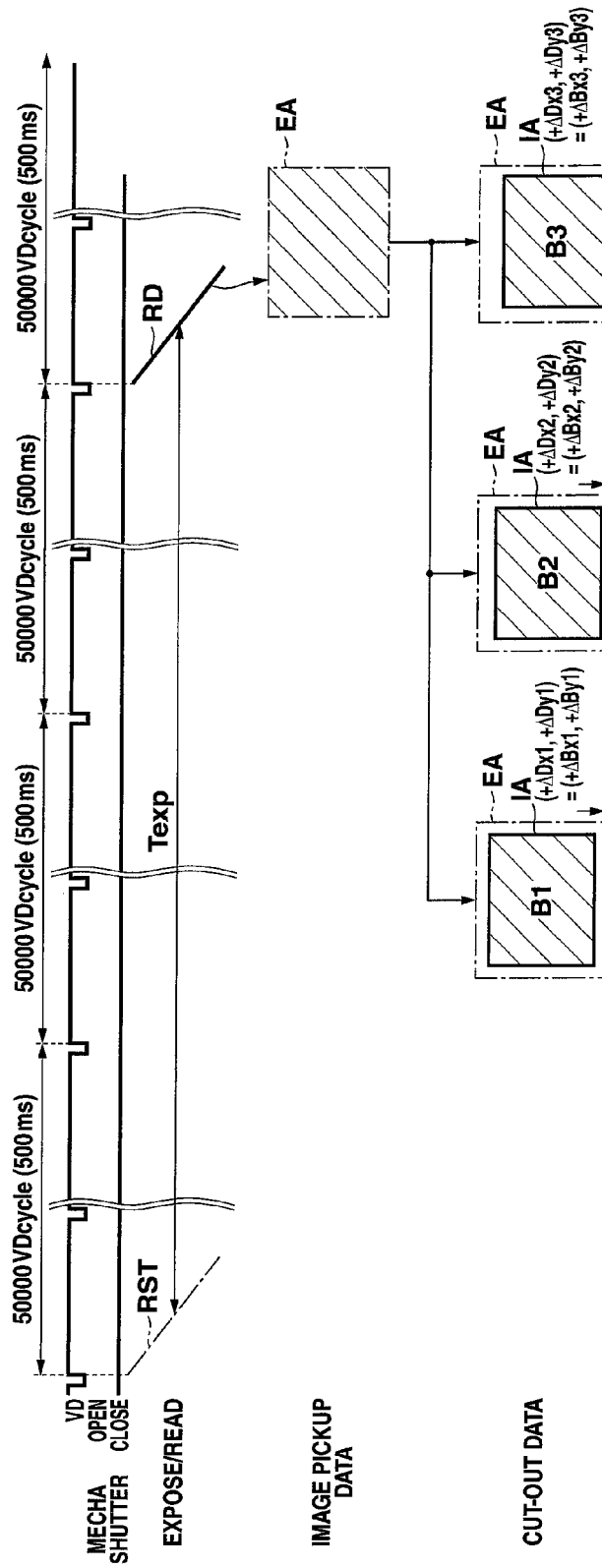
FIG. 22 is a timing chart showing an operation at the time of performing live-bulb photographing of a dark-time image in a second embodiment.
Figure 23:
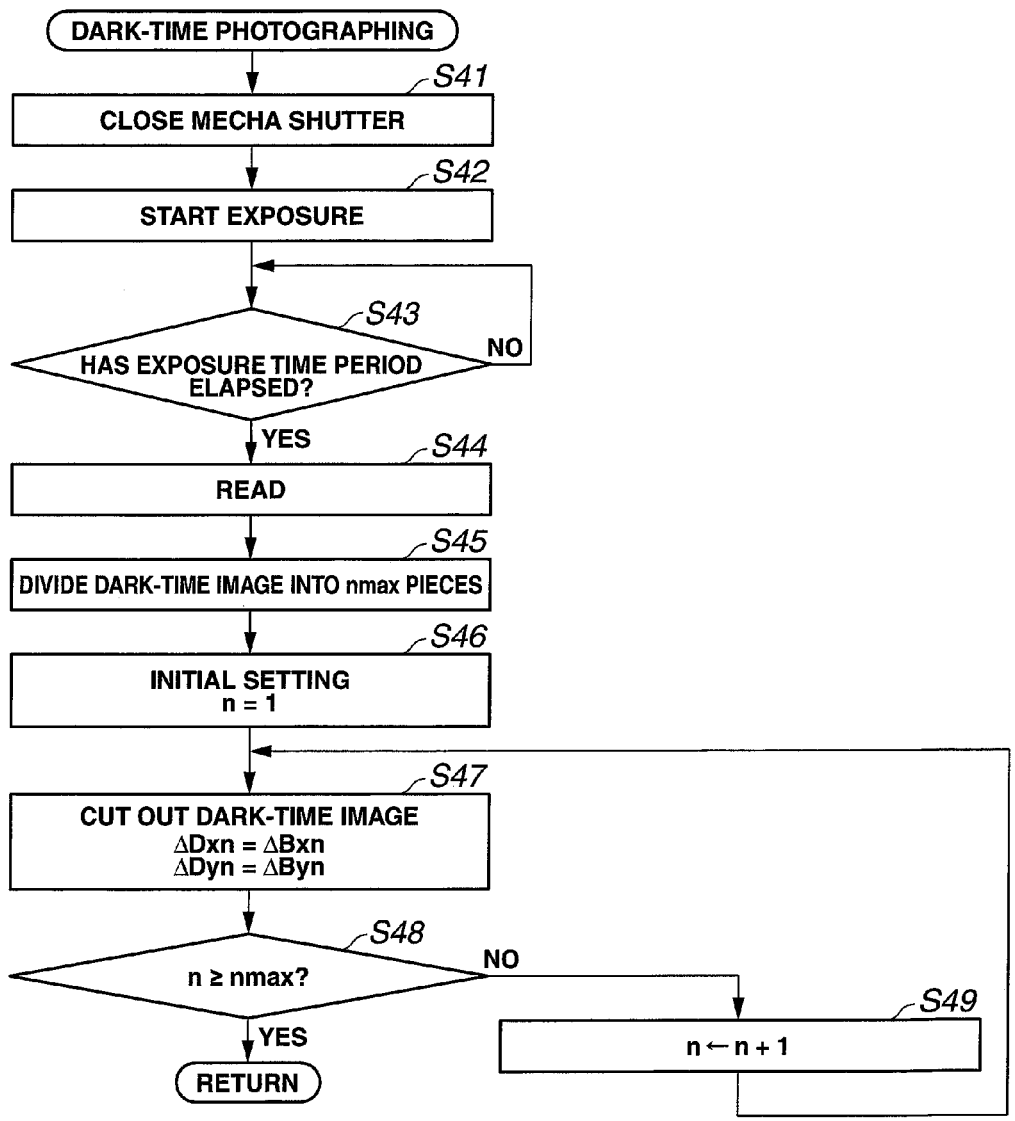
FIG. 23 is a flowchart showing the dark-time photographing process at step S3 in FIG. 19 in the second embodiment.
Figure 24:
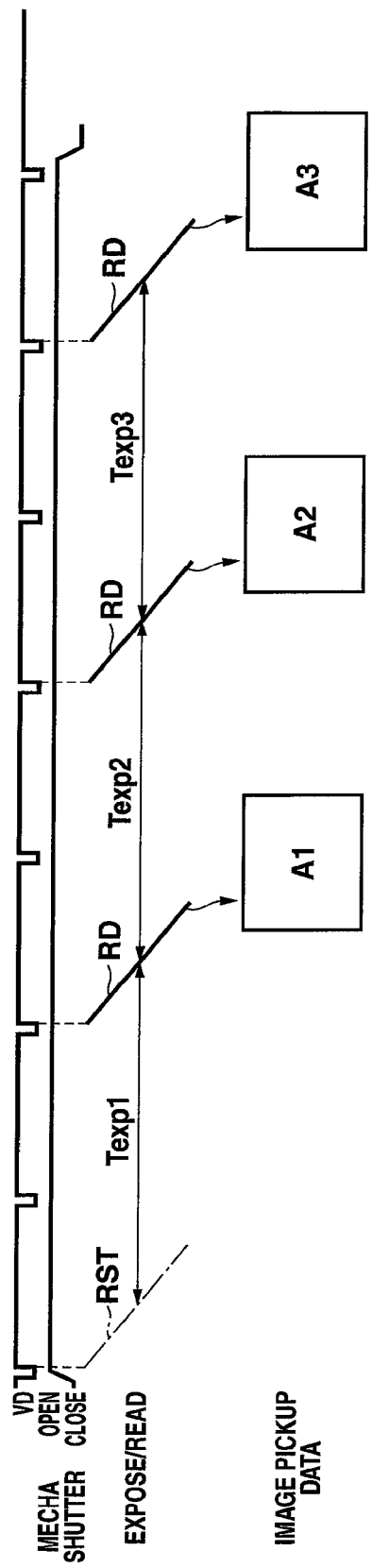
FIG. 24 is a timing chart showing an operation at the time of performing live-bulb photographing of a bright-time image conventionally.

FIGS. 22 and 23 show a second embodiment of the present invention. FIG. 22 is a timing chart showing an operation at the time of performing live-bulb photographing of a dark-time image. FIG. 23 is a flowchart showing a dark-time photographing process at step S3 in FIG. 19.

In the second embodiment, parts similar to those in the first embodiment described above will be given same reference numerals, and description thereof will be appropriately omitted. Only different points will be mainly described.

In the present second embodiment, a process from acquisition of a dark-time image up to acquisition of addition dark-time image data B is different in comparison with the first embodiment described above.

The dark-time photographing process is a process for acquiring pieces of time-division dark-time image data by dividing pixel values of dark-time image data at an exposure time period ratio, which is a ratio of the divided exposure time period Texpn to the exposure time period Texp, by the image cut-out section 3a which functions as the dark-time image cut-out section, and cutting out time-division cut-out dark-time image data at a same cut-out position as that of time-division cut-out bright-time image data for each of the pieces of time-division dark-time image data constituting dark-time image data corresponding to pieces of time-division bright-time image data, respectively.

That is, when the dark-time photographing process starts at step S3 in FIG. 19, a process shown in FIG. 22 is executed in the present embodiment.

Then, the mechanical shutter 13 is closed first similarly to step S31 (step S41), and exposure is started similarly to step S32 (step S42).

Then, in the present embodiment, it is waited that the whole exposure time period Texp elapses instead of the divided exposure time period Texpn (step S43). That is, in the present embodiment, divided exposure is not performed for a dark-time image, but exposure for the whole exposure time period Texp is performed once.

When the whole exposure time period Texp has elapsed, reading of pixels is performed by starting application of a read pulse RD in synchronization with a vertical synchronizing signal VD (step S44).

Next, by dividing obtained dark-time image data for the whole exposure time period Texp into the maximum counter number nmax pieces for bright-time photographing to obtain multiple pieces of time-division dark-time image data (step S45). The division is for dividing only pixel values without changing the number of pixels and the like. That is, the pieces of time-division dark-time image data are acquired by dividing pixel values of respective pixels of dark-time image data at the exposure time period ratio, which is a ratio of the divided exposure time period Texpn to the exposure time period Texp, by the image cut-out section 3a which functions as the dark-time image cut-out section.

After that, initial settings are made, such as setting 1 to the counter n for counting the number of pieces of processed time-division dark-time image data (step S46).

Then, the image cut-out position ($\Delta Dxn$, $\Delta Dyn$) of an n-th piece of time-division dark-time image data is set to an image cut-out position ($\Delta Bxn$, $\Delta Byn$) related to the n-th time-division exposure of bright-time photographing, that is, the mecha image stabilization amounts ($\Delta Mxn$, $\Delta Myn$), and dark-time image cut-out for cutting out a piece of time-division cut-out dark-time image data Bn of the cut-out area IA from the pieces of time-division dark-time image data of the whole image pickup area EA is performed (step S47).

After that, it is judged whether the dark-time photographing process is to be ended or not on the basis of whether or not the counter n has reached the maximum counter number nmax for bright-time photographing (step S48).

Here, if the dark-time photographing process is not to be ended, the value of n is increased by one (step S49), and then the flow returns to step S47, where the process as described above is repeated.

If it is judged at step S48 that the dark-time photographing process is to be ended, the flow returns to the image stabilization live bulb process shown in FIG. 19.

Note that bright-time photographing is performed prior to dark-time photographing in the first embodiment described above, and this is because a divided exposure time period and a cut-out area in the dark-time photographing are not determined unless the bright-time photographing is performed first. In the present embodiment, however, it is also possible to perform the dark-time photographing prior to the bright-time photographing because of a procedure in which pieces of time-division dark-time image data are acquired by dividing dark-time image data after all pieces of time-division bright-time image data and dark-time image data are acquired.

According to the second embodiment as described above, advantages substantially similar to those of the above first embodiment can be obtained, and it is possible to reduce power required at the time of reading because a dark-time image is read only once. Furthermore, in the process of the first embodiment described above, the number of times of reading a bright-time image is nmax, and the number of times of reading a dark-time image is nmax, so that a total is 2 nmax. In the process of the present embodiment, however, the number of times of reading a bright-time image is nmax, and the number of times of reading a dark-time image is 1, so that a total is (nmax+1). Therefore, it is possible to reduce read noise. When a noise model in which a read noise amount is in proportion to a square root of the number of times of reading is given as an example, a noise amount $\sqrt{(nmax+1)}$ of the second embodiment, in comparison with a noise amount $\sqrt{(2 nmax)}$ of the first embodiment, gradually comes near to $1/\sqrt{2} \approx 0.7$ as nmax becomes larger. Therefore, if nmax is a large value, read noise can be reduced by about 30 percent.

Though, in the first and second embodiments, mechanical image stabilization has been described as such a process that reset to an initial position is performed each time, it goes without saying that it is not necessarily required to perform reset to the initial position each time. That is, by setting to the side of an area near the initial position (center) of a mechanical image stabilization driving range (near the initial position) instead of reset to the initial position, a substantially similar purpose can be achieved. This is because, for example, in the case where a driving time period for reset to a driving initial position of the mechanical image stabilization is relatively long for an exposure time period, such a case may be caused that a driving time period should be restricted by performing only driving for bringing the mechanical image stabilization section near to the initial position without returning the mechanical image stabilization section to the initial position.

[Modified Technique]

Next, a modified technique of each embodiment described above will be described. Here also, as for parts similar to those in each embodiment described above, description thereof will be appropriately omitted.

In the above description, it was stated that, because $(A1+A2+ \ldots +Anmax)-(B1+B2+ \ldots +Bnmax)=(A1-B1)+(A2-B2)+ \ldots +(Anmax-Bnmax)$ is satisfied for calculation of a corrected image, calculation of a right-hand side may be performed instead of calculation of a left-hand side.

In the equation, An and Bn (here, n=1, 2, ..., nmax) are time-division cut-out bright-time image data and time-division cut-out dark-time image data obtained from the cut-out area IA, respectively. Time-division bright-time image data and time-division dark-time image data before cut-out which are obtained from the whole image pickup area EA are indicated by $\alpha n$ and $\beta n$, respectively.

As for the cut-out, if n indicates the same number, cut-out areas for $\alpha n$ and $\beta n$ are the same. Therefore, a cut-out operator corresponding to n is denoted by "fn·". Furthermore, addition for n=1 to nmax is denoted by $\Sigma$.

Then, the above equation can be rewritten as follows:

$$\Sigma fn \cdot \alpha n - \Sigma fn \cdot \beta n = \Sigma (fn \cdot \alpha n - fn \cdot \beta n)$$

The equation (for example, a right hand side of the equation) can be further transformed as follows:

$$\Sigma (fn \cdot \alpha n - fn \cdot \beta n) = \Sigma fn \cdot (\alpha n - \beta n)$$

Therefore, even if, after the pieces of time-division dark-time image data $\beta n$ obtained from the whole image pickup area EA are subtracted from the pieces of time-division bright-time image data $\alpha n$ obtained from the whole image pickup area EA to acquire corrected time-division image data for which dark current noise has been reduced, the cut-out calculation "fn·" is performed for the corrected pieces of time-division image data to acquire pieces of cut-out corrected time-division image data for which electronic image stabilization has been performed, a similar result can be obtained. After that, the pieces of cut-out corrected time-division image data are added together to generate corrected image data.

In this case, however, it is necessary to store all the pieces of time-division bright-time image data $\alpha n$ or the pieces of time-division dark-time image data γn of bright-time photographing or dark-time photographing which is performed first. As a storage section configured by a buffer memory or the like corresponding to multiple frames for storing all the time-division images, the memory card 6 can be used. Otherwise, a dedicated storage section may be provided in the image pickup apparatus. Note that the pieces of time-division dark-time image data γn may be acquired by performing time-division exposure as in the first embodiment described above, or may be acquired by performing exposure once and performing division as in the second embodiment described above.

Examples of a configuration in the case of the modified technique are as follows:

[Configuration 1]

An image pickup apparatus including:

an image pickup section performing bright-time photographing in which an object image formed by dividing an exposure time period into a plurality of exposure time periods is picked up by an image pickup device to acquire a plurality of pieces of time-division bright-time image data and dark-time photographing in which the image pickup device is shielded from light to acquire dark-time image data of the exposure time period, in arbitrary order;

a storage section storing at least image data of any of the bright-time photographing and the dark-time photographing that has been performed first;

a shake detection section detecting a shake at the time of the bright-time photographing;

a dark current correction section acquiring pieces of corrected time-division image data for which dark current has been corrected by subtracting pieces of time-division dark-time image data constituting the dark-time image data corresponding to the pieces of time-division bright-time image data, respectively, from the pieces of time-division bright-time image data;

an electronic image stabilization section cutting out cut-out corrected time-division image data for which the shake has been corrected, for each of the pieces of corrected time-division image data on the basis of the shake detected by the shake detection section; and an addition section adding the pieces of cut-out corrected time-division image data together to generate corrected image data.

[Configuration 2]

The image pickup apparatus according to configuration 1, wherein the pieces of time-division dark-time image data are acquired by dividing an exposure time period into a same plurality of divided exposure time periods as the plurality of pieces of time-division bright-time image data, by the image pickup section.

[Configuration 3]

The image pickup apparatus according to configuration 1, further including a dividing section acquiring the pieces of time-division dark-time image data by dividing pixel values of the dark-time image data at an exposure time period ratio which is a ratio of the divided exposure time period to the exposure time period.

As a concrete configuration in the above configurations, for example, the image pickup section 2 corresponds to the image pickup section; the memory card 6, the dedicated storage section provided in the image pickup apparatus or the like corresponds to the storage section, as described above; the image processing section 3 corresponds to the addition section; and the image processing section 3 corresponds to the division section. Though the configurations 1 to 3 as an image pickup apparatus have been described, an image pickup method performing processes similar to those of the image pickup apparatus is also possible.

Advantages substantially similar to those of each embodiment described above can be obtained by the modified technique.

Note that, in each of the embodiments and the like described above, description has been made on an example of using both of mecha image stabilization and electronic image stabilization. As for the electronic image stabilization, however, it is possible to acquire more powerful image stabilization capability by causing the size of the cut-out area IA relative to the whole image pickup area EA to be smaller on the assumption that the time-division exposure time period is sufficiently shorter than a typical shake cycle. Therefore, if it does not matter that the cut-out area IA is smaller, that is, if it does not matter that an angle of field is narrow or that the number of pixels of a recorded image is smaller, it is possible to obtain advantages substantially similar to those of each of the embodiments and the like described above only by the electronic image stabilization. Therefore, in this case, it is not necessarily required to use mecha image stabilization together with electronic image stabilization. In this case, it is possible not only to realize hand-held live bulb photographing at a low cost without increasing the size of the image pickup apparatus but also to realize a much lower cost because mecha image stabilization is unnecessary.

Though description has been made above mainly on an image pickup apparatus, an image pickup method performing processes similar to those of the image pickup apparatus, an image pickup program for causing a computer to execute processes similar to those of the image pickup apparatus, computer-readable non-temporary storage medium in which the image pickup program is recorded, and the like are also possible.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
   a bright-time image pickup section which picks up a formed object image by an image pickup device to acquire bright-time image data;
   a dark-time image pickup section which shields the image pickup device from light to acquire dark-time image data with a same exposure time period with which the bright-time image data is acquired;
   a shake detection section which detects a shake;
   an electronic image stabilization section which cuts out cut-out bright-time image data for which the shake is corrected, from the bright-time image data, based on the shake detected by the shake detection section;
   a dark-time image cut-out section which cuts out cut-out dark-time image data at a same cut-out position as the cut-out bright-time image data, from the dark-time image data; and
   a dark current correction section which generates corrected image data for which dark current is corrected, by subtracting the cut-out dark-time image data from the cut-out bright-time image data;
   wherein:
   the bright-time image pickup section acquires the bright-time image data as a plurality of pieces of time-division bright-time image data for which the exposure time period is divided into a plurality of divided exposure time periods;

the electronic image stabilization section cuts out time-division cut-out bright-time image data for which the shake is corrected, for each of the pieces of time-division bright-time image data;

the dark-time image cut-out section cuts out time-division cut-out dark-time image data at a same position as the time-division cut-out bright-time image data, for each of pieces of time-division dark-time image data constituting the dark-time image data corresponding to the pieces of time-division bright-time image data, respectively; and the dark current correction section generates the corrected image data for which dark current is corrected, based on the time-division cut-out bright-time image data and the time-division cut-out dark-time image data.

2. The image pickup apparatus according to claim 1, wherein the pieces of time-division dark-time image data are acquired by dividing an exposure time period into a same plurality of divided exposure time periods as the plurality of divided exposure time periods used for the plurality of pieces of time-division bright-time image data, by the dark-time image pickup section.

3. The image pickup apparatus according to claim 1, wherein the pieces of time-division dark-time image data are acquired by dividing pixel values of the dark-time image data at an exposure time period ratio which is a ratio of the divided exposure time period to the exposure time period, by the dark-time image cut-out section.

4. The image pickup apparatus according to claim 1, further comprising a mechanical image stabilization section which mechanically corrects a relative deviation between the image pickup device and the object image based on the shake detected by the shake detection section;
wherein:
the mechanical image stabilization section operates while each of the plurality of pieces of time-division bright-time image data is exposed, and is set to one of an initial position and a position near the initial position each time one of the plurality of pieces of time-division bright-time image data is acquired; and
the electronic image stabilization section cuts out time-division cut-out bright-time image data at a cut-out position corresponding to an amount of drive of the mechanical image stabilization section immediately before the mechanical image stabilization section is set to the one of the initial position and the position near the initial position when the piece of time-division bright-time image data after the mechanical image stabilization section is set to the one of the initial position and the position near the initial position is acquired.

5. An image pickup method comprising:
a bright-time image pickup step of picking up a formed object image by an image pickup device to acquire bright-time image data;
a dark-time image pickup step of shielding the image pickup device from light to acquire dark-time image data with a same exposure time period with which the bright-time image data is acquired;
a shake detection step of detecting a shake;
an electronic image stabilization step of cutting out cut-out bright-time image data for which the shake is corrected, from the bright-time image data, based on the shake detected by the shake detection step;
a dark-time image cut-out step of cutting out cut-out dark-time image data at a same cut-out position as the cut-out bright-time image data, from the dark-time image data; and
a dark current correction step of generating corrected image data for which dark current is corrected, by subtracting the cut-out dark-time image data from the cut-out bright-time image data;
wherein:
the bright-time image pickup step acquires the bright-time image data as a plurality of pieces of time-division bright-time image data for which the exposure time period is divided into a plurality of divided exposure time periods;
the electronic image stabilization step cuts out time-division cut-out bright-time image data for which the shake is corrected, for each of the pieces of time-division bright-time image data;
the dark-time image cut-out step cuts out time-division cut-out dark-time image data at a same position as the time-division cut-out bright-time image data, for each of pieces of time-division dark-time image data constituting the dark-time image data corresponding to the pieces of time-division bright-time image data, respectively; and
the dark current correction step generates the corrected image data for which dark current is corrected, based on the time-division cut-out bright-time image data and the time-division cut-out dark-time image data.

6. The image pickup method according to claim 5, wherein the pieces of time-division dark-time image data are acquired by dividing an exposure time period into a same plurality of divided exposure time periods as the plurality of divided exposure time periods used for the plurality of pieces of time-division bright-time image data, by the dark-time image pickup step.

7. The image pickup method according to claim 5, wherein the pieces of time-division dark-time image data are acquired by dividing pixel values of the dark-time image data at an exposure time period ratio which is a ratio of the divided exposure time period to the exposure time period, by the dark-time image cut-out step.

* * * * *